United States Patent [19]

Son et al.

[11] Patent Number: 5,434,956
[45] Date of Patent: Jul. 18, 1995

[54] METHOD AND APPARATUS FOR PRINTING AN IMAGE IN A SPECIFIED POSITIONAL RELATIONSHIP WITH A PREPRINTED REGISTRATION MARK

[75] Inventors: Myungsae Son, Rancho Santa Fe; Craig T. Johnson, San Diego; Richard M. Dartez, San Marcos, all of Calif.

[73] Assignee: Hewlett-Packard Company, Palo Alto, Calif.

[21] Appl. No.: 971,429

[22] Filed: Nov. 4, 1992

[51] Int. Cl.[6] .............................................. G03C 11/02
[52] U.S. Cl. .................................... 395/105; 395/117; 356/401
[58] Field of Search ............... 395/100, 101, 105, 106, 395/116, 111, 117; 101/93.01, 178–181, 211, 219–221, 225, 227, 228, 231, 248, 426; 356/401; 346/134, 136, 140, 157; 400/708, 708.1, 578–580, 607–607.3, 119; 226/9, 24, 27–31; 358/515, 519; 382/1

[56] References Cited

U.S. PATENT DOCUMENTS 4,569,584 11/1986 St. John et al. ..................... 355/14
4,857,715 8/1989 Koch et al. .......................... 235/456

Primary Examiner—Mark R. Powell
Assistant Examiner—Tracy M. Legree

[57] ABSTRACT

Each two-dimensional alignment mark on a printing medium is found by using information about the whole mark area, or with respect to each of two different directions relative to the medium by using a distinctive two-dimensional pattern or characteristic of the mark; or by finding the mark centroid, or by scanning the mark region to obtain a two-dimensional representation for analysis—and preferably by combinations of these procedures. An image is then aligned and printed by reference to the mark so located. A previous image may also be preprinted in known relation with the mark, so that the new image is aligned with the preprinted one—sometimes on the same piece of medium. Preferably information used includes the mark's intended size, shape, areal disposition and other properties; and a two-dimensional search template is defined which matches the mark in at least one of these. A template position is then found that essentially maximizes areal intersection with the mark; this position is then treated as the mark position, for printing the new image. The invention preferably determines a position of the template along each of two directions in alternation—maximizing the areal intersection with respect to shifting along each direction, iteratively—until no significant increase is obtained.

42 Claims, 10 Drawing Sheets

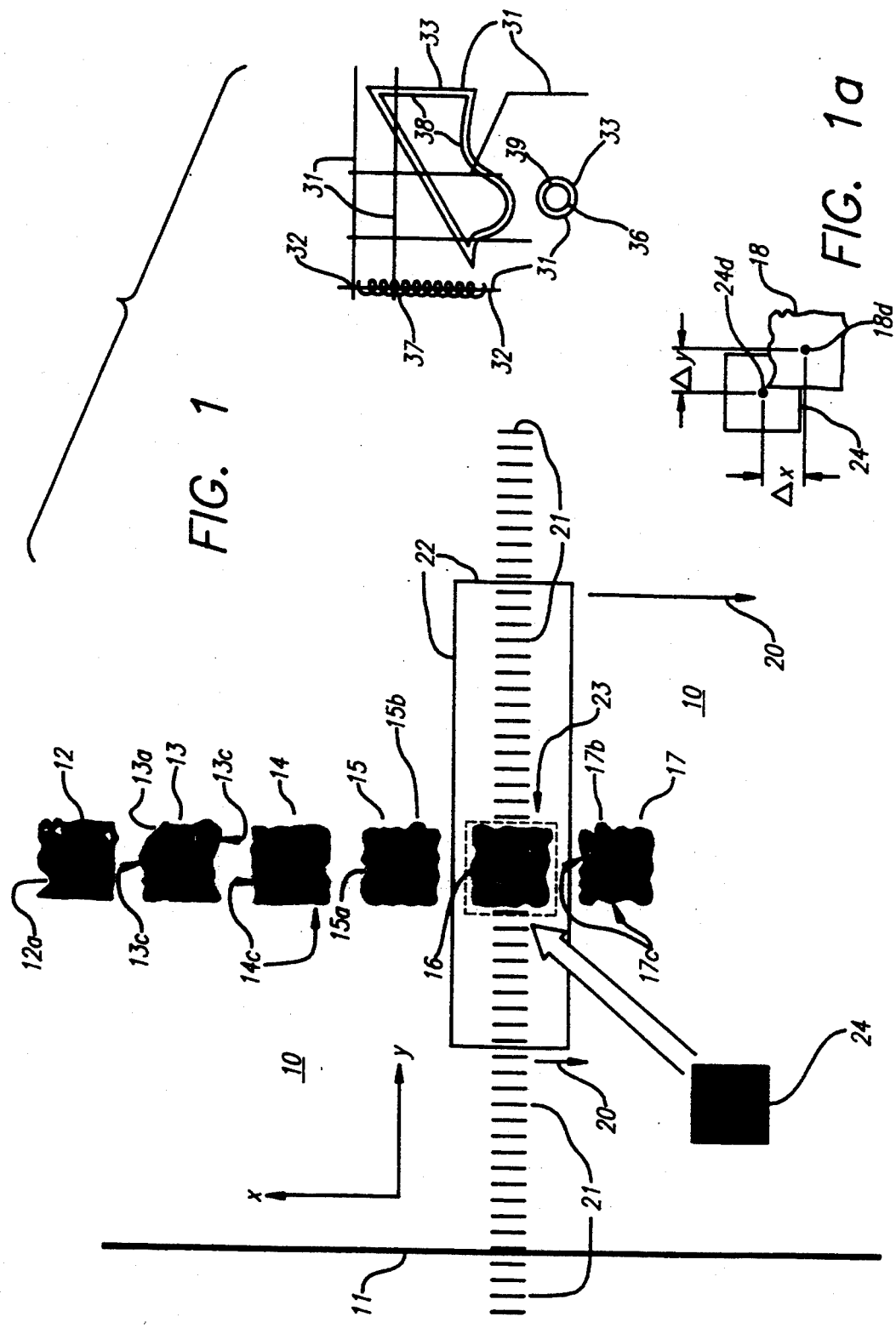

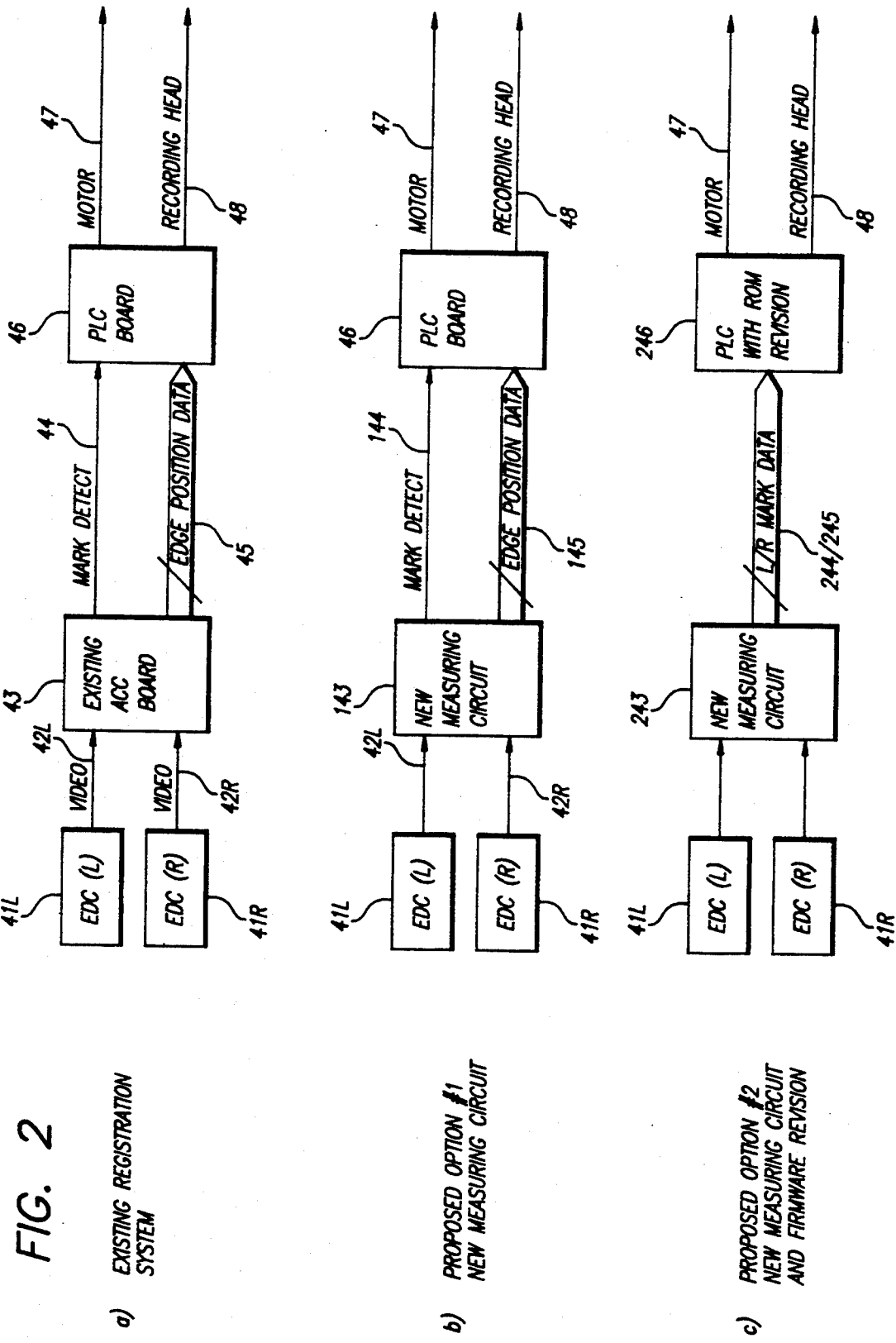

METHOD AND APPARATUS FOR PRINTING AN IMAGE IN A SPECIFIED POSITIONAL RELATIONSHIP WITH A PREPRINTED REGISTRATION MARK

BACKGROUND

1. Field of the Invention

This invention relates generally to systems for mechanically creating line- or pixel-based drawings piecemeal on a printing medium—whether the actual application of image to medium is performed by a laser-and-electrostatic, inkier, or dot-matrix process, or otherwise. More particularly the invention relates to mutually aligned printing of plural images, such as the several related images in a multicolor drawing, or in the set of masters made preliminary to printing a lithographic color separation.

For purposes of this document the term "printing medium" encompasses media which may be more familiarly regarded as only intermediaries—such as, for example, transparencies for use as lithographic masters.

2. Prior Art

Systems that create images piecemeal mechanically are subject to special registration problems arising from distortion and unintended shifting of the printing medium during the drawing process. Such problems are acute in large reel-to-reel drawing machines that very rapidly make multicolor drawings; some such drawings are tens of feet in length, but expected to be in intercolor register to just a few thousandths of an inch.

Even in smaller equipment, in systems that use liquid ink on paper, distortion of the paper can arise from application of the ink—as, for example, cockle of the paper. Still other systems are subject to like distortions arising from application of tension or toner, from environmental exposure of the medium, etc.

Thus each technology has its own sources of effective dislocation of each segment or portion of an image relative to others. Correction requires shifting of either the medium or the image on a substantially continuous basis, to maintain alignment between successive images—or, what amounts to the same thing, between each image and some sort of preestablished positional reference or coordinate grid on the medium.

Some prior systems control the position of printing for each segment of a drawing by reference to registration marks. These are typically preprinted alongside a previous single-color image—the marks and the image being formed together on the same medium. To correct for transverse expansion or contraction, and also for angular skew of the medium, marks sometimes are placed along two opposite sides of the image.

In some such systems, such as that disclosed in U. S. Pat. No. 4,721,969 to Asano (and in some of the prior art discussed in that patent), an essentially linear sensor array—such as a line of charge-coupled detectors (CCDs)—is employed to locate the edge of each registration mark in sequence. Assrio discusses locating the edges of respective marks preprinted along opposite sides of the image, so as to detect and so enable correction for angular skew as just mentioned.

In some related systems these functions may be performed in duplicate, to detect—for each mark—one edge in each of two mutually perpendicular directions. Such systems thereby locate the mark in two dimensions.

In most or all prior systems, each raster line from the sensor array is immediately processed to determine whether it reveals an encounter with a registration mark. If not, each line is immediately discarded (thereby wasting an opportunity to obtain useful information by correlation with subsequent lines).

The Assrio system is relatively advanced in that it makes corrections by software manipulations rather than by physically moving the printing medium or the writing mechanisms. His system is undesirable, however, in that he implements the software corrections by dropping or inserting a "bit"—presumably in most cases really a row of bits or pixels—to keep his writing mechanisms in synchronism with the preapplied registration marks. This procedure invites loss or distortion of image information.

(Asano does briefly suggest that instead "the drive during a recording operation for one line can be changed." He does not disclose how to do such a thing; it would place great demands upon the control system. Moreover, the idea of stopping the drive so as to superimpose one line or row of pixels on another—or advancing the drive to leave one line or row blank—would produce unacceptable image quality in the resulting striped effect.)

In prior systems several writing passes, for example four passes, may be used to create a four-color (typically cyan, magenta, yellow and black) picture. In this approach the first writing pass operates on an "open loop" basis—in other words, the apparatus is driven (without any servocontrol feedback) to produce a nominally regular spacing of elements that should be regularly spaced, etc.

Subsequent passes are servocontrolled, using feedback from the found positions of registration marks created in association with the first image. This represents an effort to align each segment of the later images with the corresponding segments of the first one.

It is known, however, as mentioned in U. S. Pat. No. 4,569,584 to St. John et al., that use of an open-loop first pass can lead to misalignment of the subsequent images with the first. This occurs because dynamic operation of the writing system in an open-loop mode diverges from dynamic operation under feedback control based upon the registration marks. Accordingly the first image—although in principle aligned more perfectly with the registration marks—is not as well aligned with the later images.

Therefore the St. John system and probably others instead provide for a first pass which preprints marks only, with substantially no other image. Thus instead of, for example, four passes to create a three-color-plus-black picture, such systems may use five passes—all of the last four being used to write onto the medium in a servocontrolled mode. (As St. John et al. mention, marks may instead be factory-preapplied to the printing medium. It is true that this raises the cost of the medium, but may be cost-effective in special environments with relatively small pieces of medium—such as, for example, transparency stock for use in making lithographic printing plates.)

In addition, some systems provide for a preliminary pass in which nothing is printed, but the medium is simply allowed to equilibrate with the temperature, humidity and perhaps chemical constituency of the environment. Such a preliminary pass is sometimes called a "conditioning pass".

The present document is equally applicable to refinement of all such methods. As will be seen, all these approaches suffer from a common problem.

In particular, as mentioned above, prior registration-mark detection systems find each mark by various techniques that detect the edge (or edges) of the mark. In effect such systems are intended to be—and substantially are—one-dimensional, with respect to each direction in which the mark edge is to be located.

That approach unavoidably provides very little data for each mark location; inherently, therefore, such a system is extremely sensitive to noise in the detection process. This is true whether the noise arises from imperfections in the preprinted mark or is developed in the detection system itself.

For instance the system will badly mislocate the mark if it was printed too lightly, or blurred, or with its leading edge (the edge closer to the direction from which the sensor system approaches) missing or indented. An indent or missing chunk along the edge, due for example to isolated imperfections in the surface of the printing medium or from occasional faulty operation of a writing mechanism, is sometimes called "flare".

In this field, however, terminology varies and is sometimes inconsistent. In particular, the term "flare" is sometimes used instead for opposite sorts of artifact in which an exploded dark area appears to be splashed from the registration mark.

For purposes of this document the term will be used more generally to describe both these effects—that is to say, both encroachment of whiteness from the white area into the mark, and encroachment of blackness outward from the mark into the surrounding white area. With respect to the latter, the term "flare" will be used to cover both discrete islands of black and attached protrusions from the mark.

Like problems occur even if the mark has a portion missing just inside the leading edge of the mark—in other words, enclosed within a solid line along the edge. This effect is usually called "dropout". (In our usage of the term "flare" described above, the generation of a discrete island of black can now be seen as the converse of "dropout".)

Dropout can be particularly troublesome if the missing internal portion is in a positional range within the field of a sensor that is pointed toward the leading edge. In such situations the sensor may average into its response the influence of the internal dropout region, and so may miss or mislocate the leading edge of the mark.

For two reasons, such flare and dropout problems are particularly significant for marks that are very small. First, with such marks, tiny imperfections can represent a large fraction of the signal along the leading edge.

Second, even the best available printing technologies often perform marginally when called upon to write a single pixel or a very small group of pixels. In particular such marginal operation is particularly likely to be erratic just after the apparatus is turned on, when it is not completely up to operating temperature.

Writing artifacts can also be generated in the pigment-delivery stage. In electrostatic systems, for example, optical-density variations can arise from incomplete development of the image by the electrically charged pigment—usually called "toner"—whether due to exhaustion of the toner supply or otherwise.

In addition, readers who are skilled in the field of electrooptical systems will appreciate that mark-sensor systems operate in the real world of vibration, airborne dust and surface-corrupting chemicals, electrical power-line disturbances, and electromagnetic interference from other electronic apparatus. Accordingly in the generation of mark-detection signals it is not economically feasible to eliminate occasional detection artifacts—both spurious indications of, and spurious failures to indicate, a mark or in particular a small element of a mark.

Hence all these effects militate in favor of registration marks that are relatively large, solid and geometrically regular—and therefore generally obtrusive. The larger, blacker and straighter the mark, the less sensitive to imperfections a one-dimensional sensor system may be. Such marks, however, may be described as "clubby".

They detract from the aesthetics of the finished product—the printed picture or diagram. They also therefore detract from the overall competitive appeal of the automatic drawing equipment. Even then, they do not adequately resolve the problems of sensitivity to flare, dropout, light or blurred printing, optical and electronic interference, etc.

A somewhat parallel discussion of signal-to-noise problems in registration-mark location appears in the St. John '584 patent at columns 33 and 34. As there suggested, a representative signal-to-noise ratio for operation of the mark-locating system is only 1/50.

The St. John system does have one feature that may be aimed at reducing sensitivity to edge effects: rather than detecting only one edge of each mark, St. John et al. arrange sensors or detectors to respond to either two opposed edges of the same mark, or the trailing edge of one mark and leading edge of the next. This feature is illustrated in FIG. 2, and FIGS. 8 through 10, of the '584 patent; and discussed in the corresponding text.

Those passages explain that the paired detectors or sensors in each arrangement are used to find a "balance" condition, in which the response from the two edges is equal. Consideration of this response regimen suggests that the result may be to partially average out the edge-imperfection effects, as between the two edges being sensed simultaneously.

For random artifacts this approach may be slightly beneficial, as it should halve the response to each artifact. This is not really a large enough factor, however, to obviate the fundamental problem, introduced earlier, of an insufficient amount of data to firmly establish the position of each mark.

The balanced-response technique, however, does introduce a complication in understanding the concepts of the present invention. For this reason we shall now discuss in some detail the precise nature of St. John's balanced dual-sensor configuration.

First, as already suggested, that system operates in substantially a one-dimensional mode, for its objective is to determine the position of an implicit line, or as St. John et al. put it a "transition" point. They refer to a transition between (1) a range of positions where one of the two sensors has higher response and (2) an adjacent range of positions where the other sensor has higher response.

As can be seen from the St. John illustrations, however, this system works because each detector has a noninfinitesimal width—i.e., dimension along the direction of edge determination. The drawings show that at the balance point each sensor is partly on and partly off its respective edge of its respective mark, or to put it otherwise each sensor overlaps the edge to which it responds.

Were it not for this nonzero sensor width, the St. John "balance" system could not operate. To understand the character and limitations of this system, however, we must explore carefully what happens if the sensor width is increased—or is decreased.

If each sensor were made wider, the fraction of its response due to the position of the mark edge would decrease. The sensitivity with which the system could find the "balance" or "transition" point would decrease accordingly.

If each sensor were made much wider, it would be able to receive optical signals from both edges of one mark at the same time. In other words, the whole mark would be sensed.

Such an arrangement would be entirely outside the operable invention of St. John et al., because small movements of the mark relative to the detector would not change the detector response at all. This excessive visibility would make regular operation impossible.

If on the other hand each sensor were made narrower, the sensitivity would increase. At certain points in the narrowing process, however, two adverse effects would set in.

One such effect is that the two sensors might no longer be able to both reliably overlap their respective mark edges at the same time. Taking into account unavoidable fluctuations in the spacing between marks, this effect must eventually appear.

Such fluctuations after all must be present, since it is the objective of the system to determine them. If this first effect does set in, the system will completely fail in its ability to find any balance point.

The other adverse effect is failure of the geometrical assumptions implicit in St. John's illustrations. A pure, infinitesimally thin line, as already noted, cannot "overlap" an edge (and of course also cannot receive nonzero amounts of optical energy)—but long before the sensor becomes that narrow its thickness must decrease to the order of the irregularities in the mark edge.

In other words, deviations of the mark edge from rectilinearity (or such other pattern as may be assumed) may be of the same magnitude as the sensor width. When this occurs, shifting the mark relative to the detector in either direction will produce compound effects, in which part of the mark edge moves out of range of the sensor even while part of the same edge is moving into range.

In such circumstances, no regularized monotonic response from the balance system is possible. Movement of the mark edge past the detector may produce reentrant behavior—waves, rather than steps—defying any systematic location of the desired "transition" or "balance" between the two successive marks.

Thus the width of each detector must be substantially greater than zero—and this could be interpreted to mean that, in one limited sense, the detector necessarily has the property of having area—but the width cannot be too great, certainly not as great as the width of the mark. A width value within a relatively tight optimum range is required.

In addition, as mentioned earlier, the system of St. John et al. depends upon a separate detector pair for locating each mark for each dimension, or in each direction. That is, even though in one sense each locating process relies on the detectors' possessing the property of area, nevertheless each locating process is only one-dimensional, not two-dimensional. Fundamentally St. John et al. are still using only the amount of information available in two edges—twice as much data or available "signal" as in one, but still not enough for entirely satisfactory measurement precision or, therefore, accuracy.

All of this may be summarized by saying that operation of the St. John dual-detector system depends upon pseudoareal effects requiring noninfinitesimal width of the detector. From the foregoing discussion it can be seen that some such effects are always present with any detector or sensor, and some are deliberately used in systems such as the St. John invention. The determinations involved, however, remain fundamentally one-dimensional.

The purpose of this extended discussion of the St. John system will become more clear shortly, upon introduction of tile present invention.

Some prior systems—including that presented in the St. John '584 patent—are made to average the found locations of several alignment-mark edges in sequence, and adjust the location of the image segment being printed in response to the averaged locations of the several mark edges. In such systems this is essential to avoid stepwise segmental displacements in the newly printed image—for example, a zigzag pattern in the image where a single mark edge was mistakenly "located" to one side of its actual position.

Such mark-edge averaging systems, however, introduce extremely undesirable effects. One of these is that they tend to correct at each point for positional errors first encountered several marks earlier.

That is, severe errors are allowed to accumulate rapidly without prompt correction. The St. John system averages, e.g., eight, sixteen or even thirty-two marks—as explained at columns 34 and 35 of the '584 patent—so that the system typically is correcting for errors actually found inches earlier.

(These relatively large numbers validate the comment made some twenty-one paragraphs above, to the effect that halving the response to edge effects, through St. John's "balanced" response technique, still does not provide sufficient data to enable reliable mark-location determinations. Again, despite its pseudoareal operating properties the St. John system fundamentally detects edge, or the balance or "transition" point between two edges; and even the information in two edges—though twice as much as the information in one—still is not enough to provide adequate signal-to-noise ratio or measurement accuracy.)

In an averaging system the actual trend of current data that are being corrected may even be the opposite of the average for a "sample group" on which the current correction is based. For example, using the numerical magnitudes suggested in the '584 patent, a sequence of sensor responses might be: 3 4 2 3 3 12 0 12 0 −1 −2 −1 −4 −4. The average of these sixteen readings is +9/16, which would round to +1 (calling for a correction of −1), but the clear-trend value for the last four responses is nearly −3. Hence the apparatus will apply a so-called "correction" of −1 pixel, even though the data are already off by −3 pixels—that is, the "correction" will shift the data even further in the wrong direction, away from its proper position.

Compensation for this effect can be attempted by positioning sensors farther upstream by, say, half the distance over which the several marks appear. This approach, however, at least in principle is undesirable because important distortions and shifts of the printing medium, etc., occur very close to the writing head. This consideration makes essential the placement of the sensors as close to the writing head as possible.

Perhaps a more-important adverse effect of a mark-edgedetection system is that good averaging is achieved only by associating a large spatial distance with the detection process. This expedient, however, inevitably also results in associating large measurement distances with each correction, which is undesirable because it degrades the correction process.

The present document is not a treatise on signal processing, and the skilled person in the art of assembling operational printing systems in general is not an expert in signal processing. As an aside, however, in the terminology of signal processing it can be appreciated that averaging techniques are simply one means of attempting to obtain a signal that is "well filtered".

The difficulty with these prior systems is that edge-detection techniques produce "poorly filtered" responses inherently. The reason is simple: an edge by its nature is intrinsically a transient phenomenon, and so by its nature is not well adapted to detection by "filtering" systems. This insight may be useful to a reader who happens to be familiar with the terminology.

St. John et al. concede (at their columns 34 and 35) many of the problems of averaging systems. They propose that optimizing the number of marks to be averaged in each "sample group" can obviate these problems, but as just explained the present inventors question such compromise solutions.

Despite all these very evident drawbacks of averaging systems, they are quite essential in all relevant prior-art registration systems because of the poor signal-to-noise ratio available in the mark-detection stage. Without averaging, as already suggested, prior-art systems would be susceptible to generating entirely unacceptable large, conspicuous lateral steps in the output data—that is, in each of the several images being created (supposedly in mutual register) on the printing medium.

Another feature disclosed by the St. John '584 patent is a continuously controlled mechanical device used to apply a correction in the "$\theta$" (theta) direction—i.e., an angular correction for skew of the medium relative to the apparatus. As can be appreciated such mechanical complexity is extremely troublesome and expensive, and best avoided if feasible.

One earlier electrostatic drawing system is of particular interest to the present inventors and their assignee, Hewlett Packard Company (HP) of Palo Alto, Calif. That system, sometimes identified as a Model 7600, was developed by HP in collaboration with Matsushita Graphics Commercial Systems (MGCS), a U. S. affiliate of the Japanese firm Matsushita.

Operation of the HP/MGCS system is good, but nevertheless susceptible to refinement. This system uses a CCD array—disposed across the entire width of the printing medium—to detect and localize both the longitudinal edges of the medium and the leading edge of each preprinted registration mark.

The edges of the printing medium, as located, are used automatically to make scan-axis (mainline, or x-axis) corrections. Accuracy of such measurements is limited by edge curl and light scattering—which have a tendency to cause the edges of the medium to appear out of focus to the CCD array.

The leading edges of the marks are used to correct for paper-axis (subline, or y-axis) corrections. Accuracy here is subject to the previously described inherent limitations of all edge-sensing systems. Both types of corrections are made on a software basis, which is greatly preferable to the expensive mechanical systems disclosed in the St. John et al. patent, but not by objectionably dropping or injecting bits (or introducing extraordinary drive demands) as in the Asano system.

Rather, the HP/MGCS system effects subline corrections by continuously controlling the speed of a motor which advances the printing medium, and mainline corrections by continuously controlling the lateral starting position of the recording head. This continuous-feedback regimen is advantageous as it maintains registration without losing image information—and. without artificially generating image elements that do not accurately represent input data.

Performance of this correction stage (as well as many other. portions) of the HP/MGCS system is of high quality. To retain this satisfactory performance, therefore, any refinement to overcome registration limitations should interface with as much as possible of the existing correction stage.

In all the earlier systems discussed above, ability to detect the mark edges is limited by artifacts, optical-density variations and translucent media as already set forth. The results of these errors can be color vectors offset by more than one pixel. In raster imaging such errors appear as hue shifts and checkerboard patterns.

To summarize, intrinsically all edge-detection systems, or interedge-transition systems, or "balance" systems, or any other fundamentally one-dimensional systems are intolerant of error from a great variety of sources. Whereas the term "robust" is currently in vogue to describe or characterize systems whose accuracy is relatively insensitive to perturbations, by contrast prior systems in the field of the present invention may be characterized as "frail".

Some systems avoid the entire matter of registration marks by fastening the printing medium to a drum or a like moving support. In such a system the location of each segment; of the medium is substantially fixed to a corresponding portion of the support.

Controlling the position of the support relative to the writing mechanism then can be taken as controlling the position of the medium relative to the writing mechanism, without the need for registration marks. Such systems, however, have their own severe drawbacks of mechanical size and complexity, cost, limited size of the printing medium, and so forth.

In other fields, not heretofore related to the plural-image printing industry, different approaches have been used for automatic locating or orienting processes. For example it is believed that in object identification for vision systems, for printed-circuit board alignment, and for industrial component identification, schemes are in use that entail pattern matching.

Signal pattern recognition is also used in even more-remote and more-abstract applications such as identifying radio-frequency transmissions or processing digital signals. As far as we are aware, however, none of such techniques has been suggested for use in alignment of images for printing.

Thus the prior art in this field has failed to provide robust techniques for locating registration marks and printing images in alignment with such marks.

SUMMARY OF THE DISCLOSURE

The present invention provides exactly such a robust procedure, which resolves all of the prior-art problems described above. Moreover the invention does so in an economical and entirely cost-effective way.

Our invention, as we now contemplate it, has six primary aspects or facets, which at least in principle may be used independently to obtain substantially all the benefits of the invention. In four of these now-preferred embodiments, the invention is a method for locating a preprinted two-dimensional registration mark on a printing medium, and for printing a new image in a specified positional relationship with the mark.

This method, in a first of the several facets or aspects just mentioned, comprises locating the position of the preprinted mark by using information about substantially the entire area of the preprinted mark. It also comprises then aligning and printing the new image by reference to that located position of the preprinted mark on the medium.

In a second of its aspects, preferred embodiments of the invention are for use with such a registration mark that has at least one distinctive two-dimensional characteristic. Here the locating portion of the method is different: it includes locating the position of the preprinted mark, with respect to each of two different directions relative to the medium, by using information about the "at least one" distinctive two-dimensional characteristic of the mark.

In yet a third aspect of the invention, in preferred embodiments, the mark-position locating proceeds by first scanning the region of the mark to obtain a two-dimensional representation of that region, and then analyzing the resulting two-dimensional representation.

In yet a fourth facet of the invention, in preferred embodiments the locating is accomplished by finding the areal centroid of the mark on the printing medium.

A fifth of the facets of the invention, in its preferred embodiments, is a method for printing an image substantially in a desired location on a printing medium. This method comprises providing on the printing medium a preprinted two-dimensional registration mark that has an associated known two-dimensional pattern, and that also has a known positional relationship with the desired image location on the medium.

This fifth facet also comprises locating the position of the preprinted mark, with respect to each of two different directions relative to the medium, by using information about its associated two-dimensional pattern—that is to say, about the two-dimensional pattern that is associated with the mark. In addition, as in the aspects previously discussed, this facet of the invention comprises then aligning and printing an image by reference to the located position of the preprinted mark on the medium.

In a sixth aspect of the invention, preferred embodiments are apparatus for printing an image in alignment with preprinted registration marks. This sixth aspect of the invention provides medium-disposing means, physical image-printing means, relative image/medium position-controlling means, sensors, sensor-movement-effecting means, and circuit means for locating each mark by an areal, two-dimensional or centroidal method—and also means for adjusting the printing means by reference to the located position of a preprinted mark.

As previously mentioned, we believe that these several facets or aspects of our invention are amenable to practice independently, and they may be a description or definition of the present invention in its broadest or most general terms. Even in these very general or broad forms, however, it can now be seen that our invention resolves all the problems of the prior art.

In particular, by resorting to information about the mark area—and particularly its entire area—a locating device or process immediately gains an enormous advantage over all the prior-art systems. Much more of that kind of information exists than can possibly, on any physical basis, exist about an edge, or even about a transition between two edges.

Accordingly, many times more areal information can be made available for use, and can be actually used, than the amount of linear (i.e., edge-associated) information that can be put to use. Therefore even for a very small mark the signal-to-noise ratio, precision and accuracy can all be improved by very significant factors.

Furthermore, all this information is associated intimately with the physical location of each mark—not distributed spatially over thirty-two marks, or eight or even two. Hence each set of correction data is intrinsically associated with the immediate region of just one mark from which those data are gathered.

This in turn enables each correction to be inherently associated with just that same immediate region. This means that each correction can be made substantially in real time for the current position of the medium.

Analogously by making use of a two-dimensional characteristic of the mark—such as, for instance, the dimensions of the mark in two different directions, or the shape of the mark—a locating process or apparatus has available vastly more information than can be assembled from any one-dimensional characteristic. Once again, tremendous gains in precision and accuracy result.

The same is true of finding the centroid of a mark. In doing so, a locating system necessarily takes into account a mass of information that exceeds anything attempted by an edge locator.

Even these advantages are greatly enhanced by using a two-dimensional pattern that is associated with the mark and is distinctive, since random processes are extremely unlikely to produce any such pattern. A locating system that responds only to such a pattern essentially rejects from the detection process all optical information which fails to conform to the distinctive pattern. This is a way of obtaining data that are extremely well filtered, despite the presence of great amounts of extraneous stimuli—noise.

(In a very broad analogous sense, this sort of system may be said to produce the same benefits as a synchronous-detection system; or to enjoy the same kind of advantage that a digital magnetic-tape-playing system enjoys over an analog system. In the latter example, the magnetic fluctuations—whether truly random, patternless variations or even systematic patterns—that produce so-called "tape hiss" in the analog system are present in the digital system too, but the digital system simply ignores them and responds only to the artificial or special, distinctive magnetic patterns that represent digits.)

By employing highly distinctive patterns as registration marks, a system is enabled to reduce the size, boldness and—if desired—the spacing of marks while still obtaining large improvements in accuracy. Such marks may be characterized as "wispy" rather than "clubby", and may offer the perception of a decorative dotted-line border rather than an obtrusive mechanistic requirement.

We emphasize that our system uses the two-dimensional characteristic or pattern information for locating each mark with respect to each direction in which the mark is to be located. In other words, the same signal-to-noise benefits arise in regard to both of the dimensions in the printing medium.

This process accordingly is of a different order than prior systems, even though they locate each mark in two dimensions. Those earlier systems use information associated with one dimension or direction to find the mark in that dimension or direction only, and then use information associated with a second direction to find the mark in that second direction only.

Further, when a system according to our invention scans the region of a mark to obtain a two-dimensional representation of that region for analysis—and then later analyzes and evaluates that representation—many important advantages accrue. The entire body of areal information is made available for multiple-step digital processing.

In particular, for example, this enables replaying the data as many times as needed to test many different possible interpretations of its meaning, without any necessity for physically moving the sensors or the printing medium—or in any other way generating the data again. Such probing for areal match between actual marks and, for example, test patterns can be performed on an essentially virtual, rather than physical, basis.

This advantageous memorize-and-analyze procedure very greatly compounds the benefits of the fundamentally two-dimensional locating process of our invention. It enables our invention to harness the extreme power of fast, inexpensive modern data-processing tools—including not only advanced software methods but also very fast mathematics-coprocessing hardware.

It has now been shown that our invention as broadly characterized—in terms of several different facets or aspects that are at least in principle independent of one another—constitutes a great advancement over the prior art. Nevertheless for fullest enjoyment of all the benefits of our invention we prefer to practice all of its facets together, i. e. in conjunction.

For the same reason we also prefer to practice the invention in conjunction with certain other preferred features or characteristics. We shall now briefly summarize some of these.

For example, in certain embodiments we prefer, before locating the mark position, to preprint an image on a printing medium in a known positional relationship with a two-dimensional registration mark. In these embodiments the aligning and printing comprise printing the new image on a printing medium, in substantial alignment with the preprinted image. This new image is advantageously, for some applications, printed onto the same medium as the preprinted image.

Preferably the information about the preprinted mark that is used in the locating function includes the intended size, or shape, or areal disposition, of the mark—and most preferably all of these. Also beneficially the information that is used includes a predicted location of the mark, or (if plural marks are spaced along the printing medium) the intended spacing between marks—or most preferably both of these.

Another preference which we will now describe relates in particular to the second aspect of the invention introduced above; however, as will be readily seen this preference also has clear application to the other facets or aspects of the invention. (As will be recalled, the second aspect of the invention is used with a registration mark that has "at least one distinctive two-dimensional characteristic.") It is our preference that the locating comprise these steps:

defining a two-dimensional search template for which the at least one characteristic is substantially the same as for the preprinted two-dimensional registration mark;

then finding, relative to the preprinted mark on the medium, a position of the search template which is such as to substantially maximize the areal intersection of the mark with the search template; and then identifying that search-template found position as the located position of the preprinted mark.

It is also preferable that the template extend over a multiplicity of pixels in each of at least two different directions relative to the printing medium.

The finding step mentioned above preferably comprises the substeps of:

(a) selecting a relative starting position of the search template along both a first and a second direction, in relation to the printing medium, and initializing the search template at that starting position;

(b) then determining a relative position of the search template along the first direction, in relation to the preprinted mark on the printing medium, for which the areal intersection of the mark and search template is substantially maximized with respect to relative shifting along the first direction; and (c) then determining a relative position of the search template along the second direction, in relation to the preprinted mark on the printing medium, for which the areal intersection of the mark and the search template is substantially maximized with respect to relative shifting along the second direction.

In addition to these substeps (a) through (c), it is also preferable that the finding step comprise the further substep of iterating the two determining substeps (b) and (c) as a pair, in alternation, until substantially no increase in that maximized areal intersection results from further iteration. Moreover we prefer that all of the iterations be performed during substantially a single pass of relative physical displacement of mark-sensor means along the first direction, by the following sequence:

storing automatic sensor responses to the preprinted mark for a multiplicity of positions alone the full distance of relative displacement along the first direction, and for a multiplicity of positions along the second direction; and analyzing and evaluating those stored responses, by the iterative method just described in the preceding paragraphs.

The analyzing preferably is performed during continued relative displacement of the sensor means toward another preprinted mark in a series of preprinted marks, and preferably is completed before the sensor means in that continued relative displacement reaches the other mark.

When a template is used, as mentioned above, preferably the template size along one of the first and second directions (more preferably the first) is defined as a range of relative travel between the substantially linear array and the printing medium. Preferably the template size along the other direction (more preferably the second) is defined as the number of cells in a substantially linear array of detector cells.

In the procedure described in the preceding paragraph, we prefer that the selecting substep "(a)" mentioned earlier comprise selecting a particular group of cells, equal in number to the number used in the second size-defining substep. In conjunction with this preference, we also prefer that the first-mentioned determining substep "(b)" comprise the subsubstep of ascertaining a particular position for the range of relative travel of the array—along the first direction—for which detection of the preprinted registration mark by the particular group of cells, within that range of relative travel, is maximized.

Correspondingly we prefer also that the second-mentioned determining substep (c) comprise the subsubstep of ascertaining a new particular group of cells—equal in number to the number used in the second size-defining substep—for which new group the detection of the preprinted registration mark, within that range of motion, is maximized.

Here it is further preferable that the first-mentioned ascertaining subsubstep comprise two elements. The first is providing relative travel between the substantially linear array and the printing medium, while accumulating response signals from the particular group of cells. The second is ascertaining the particular position by reference to a point in that relative travel at which the accumulated response signal ceases to increase.

Continuing with this same arrangement, it is also preferred that the second-mentioned ascertaining subsubstep comprise sequentially analyzing the detection of the preprinted registration mark for a succession of groups of cells. The "succession" is defined by progressive shifting of the above-mentioned "number" of cells (i.e., the number of cells in the "particular group of cells") along the linear array.

Advantageously the first- and second-mentioned ascertaining subsubsteps are performed during a single pass of that relative travel. This is preferably accomplished by storing the responses for all the cells in the array over the full distance of the relative travel; and analyzing and evaluating the stored responses for a multiplicity of positions along the full distance of relative travel.

The "analyzing" just mentioned is preferably performed during continued travel of the array of cells toward another preprinted mark in a pattern of preprinted marks. We prefer that it be completed before the array of cells, in that continued travel, reaches the other mark.

Although we prefer to make the search template the same size as the preprinted mark, sometimes or perhaps even usually the template and mark are not the same size exactly (that is to say, the detection system can discriminate between their sizes). As a result, the areal intersection is, in at least one dimension, a substantially flat-topped function of search-template position.

In other words, as the template is shifted about, in the vicinity of the mark, the quantitative size of the intersection varies as a flat-topped function of template position. In still other words there is a plateau in the response of the system to such movement.

Most usually this function if viewed in graphical form may be a trapezoid, as may be understood by thinking about the geometrical relationships involved; but we believe that sometimes it can instead be a parallelogram. In these cases, the finding step preferably comprises selecting a search-template position that is substantially an average value of all positions within the flat top of the function.

In any embodiment of our invention that proceeds by locating the position of one or more preprinted marks by using information about a distinctive two-dimensional characteristic of such mark or marks, we prefer that the locating comprise resolving each preprinted mark into a multiplicity of pixels in each of at least two different directions relative to the printing medium. We also prefer that the locating comprise evaluating the preprinted mark as so resolved.

In any embodiment that proceeds by providing a preprinted two-dimensional registration mark that has an associated known two-dimensional pattern, as mentioned earlier—and by then locating the position of the mark by using information about that pattern—it is particularly advantageous that the pattern have a certain special property.

That property may be stated in mathematical terms by saying that its autoconvolution deteriorates relatively rapidly with positional error. What this means as a practical matter is merely that the pattern is of a type for which there is available an indicator of positional error that is extremely sensitive to minute displacements.

Through use of this error indicator, the pattern can be very accurately compared in position with a given "correct" pattern. Such comparison thereby permits eventual repositioning that is very precise.

All of the foregoing operational principles and advantages of the present invention, as well as preferable features or characteristics not fully elaborated in the foregoing summary, will be more fully appreciated upon consideration of the following detailed description, with reference to the appended drawings, of which:

BRIEF DESCRIPTION OF THE DRAWINGS

FIG. 1 is a diagrammatic showing of the geometrical relationships between actual marks on a printing medium and the hardware and software constructs of the present invention;

FIG. 1A is a like showing of relationships—in a preferred embodiment of the present invention—between an actual mark, in an actual position, and a software-construct template in a predicted position, when the two positions are not the same;

FIG. 2 is a highly simplified block-diagrammatic showing of one prior registration system in comparison with two alternative ways of implementing or embodying the present invention;

FIG. 7 is a perspective mechanical drawing showing, for a preferred embodiment of the invention as used in an electro-static printer with an electronic scanning head, the writing head and related apparatus in relation to the printing medium;

FIG. 8 is a mixed drawing which is partly a greatly enlarged sectional view of latent-image storage material with a single adjacent writing head, and partly an elementary electronic schematic which shows, for the FIG. 6 embodiment, driving circuitry for actuating the writing head and associated apparatus; and FIG. 9 is a like drawing showing substantially the same for the more practical, complicated case of mutiplexed matrix electrodes.

DETAILED DESCRIPTION OF THE PREFERRED EMBODIMENT

Figure 1C:
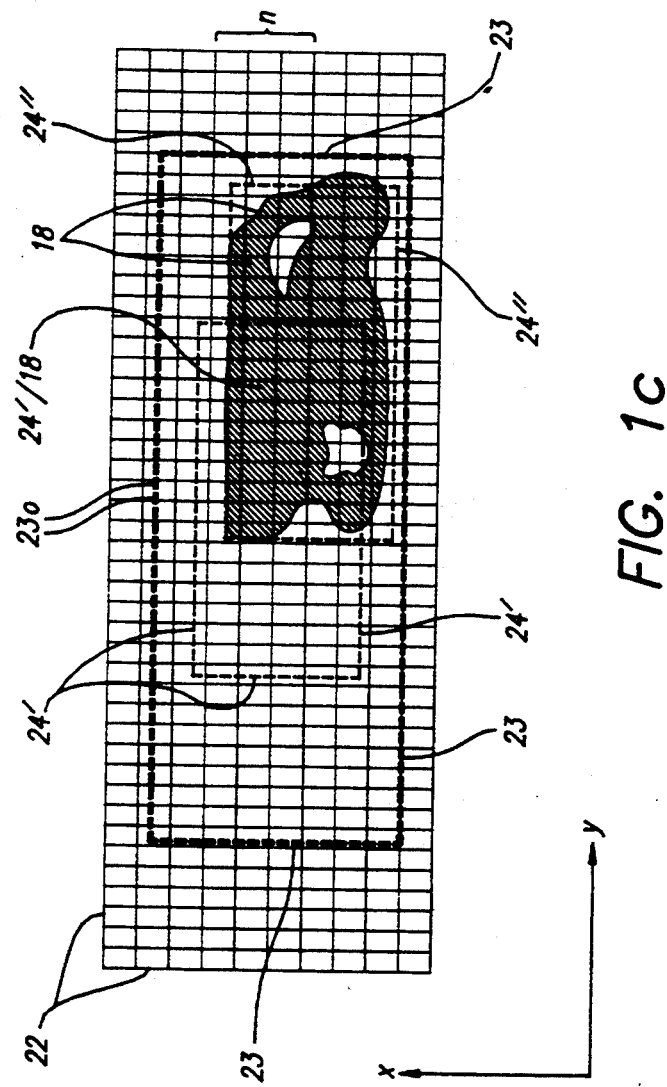
FIG. 1C is a diagrammatic showing of the beginning and end of a sequence of analytical steps performed using a data matrix developed by moving the FIG. 1 detector array just once past the region of a registration mark.

Preferred embodiments of the present invention make use of a priori knowledge of the approximate shape, size and location of preprinted registration marks. The preferred system scans—as by motion 20, FIG. 1—an entire registration mark 16, including a region 22 which should enclose the mark and which is adequately large to ensure that in essentially all cases of practical interest the entire mark will be enclosed in the region.

FIG. 1 also represents a portion of a printing medium 10 near one side or edge 11 of the medium (the left edge, as drawn), and other preprinted registration marks 12-15, 17 in a series.

Another, opposite side or edge of the medium 10 is of course present though not shown in the drawing. Correspondingly, substantially all of the other features illustrated in FIG. 1—including the various windows, sensors, etc. to be discussed now—are present along the opposite edge (the right edge) of the medium 10.

For some purposes that will be mentioned later, the signals and other phenomena related to sensing of marks along the left and right edges of the medium are automatically compared. The resulting data are usable, for instance, to derive corrections for medium or image skew, expansion or contraction, side-to-side shifting, etc.

As is typical, although attempts are made to print all these marks onto the medium as regular forms—squares, in the example—they unavoidably display various artifacts.

Such artifacts include both types of flare as defined above—that is, areas 12a, 13a, 15a where portions of the marks are missing, and also projections 15b, 17b etc. where ink has been thrown beyond the intended mark boundaries. The artifacts also include dropout—represented as white spaces or white dots 13c, 14c, 17c etc. inside the boundaries.

These variations are due primarily to irregularities in the printing medium. Some contribution, however, as previously mentioned is sometimes made by various types of pigment-delivery malfunction, including for example misfire of the writing head when it is first actuated at an isolated point.

Also shown in FIG. 1 are exemplary elements 31 of a first image or drawing preprinted on the medium, and elements 36 of another, second image which is to be printed in register with the first image elements 31. In particular the first image elements 31 exemplarily include a generally straight line 32, and the second image elements 36 include a curling line 37 which is intended to symmetrically encircle that generally straight first-image line 32. The first image 31 also includes outer shapes 33, and the second image 36 includes inner shapes 38 which are to lie symmetrically within those first-image outer shapes 33.

Not printed, or to be printed, on the medium 10 but rather disposed above it for progressive motion as indicated by the arrows 20 are optically sensitive charge-coupled detectors (CCds) 21 in a long narrow array, and an effective viewing window 22. Also moving with the CCD array 21 and window 22 as in the direction of the arrows 20 is an image-printing mechanism (not shown).

The window 22 is a so-called "hard" window, defined by physical means. Such physical means may include energizing (or using signals from) only those CCDs within the window 22—that is, between the indicated left and right boundaries of the window 22.

The CCD array is only as large as it is—that is, only as large as illustrated—for historical reasons. In the prior HP/MGCS apparatus the CCD array is used to sense the edges of the medium, and therefore extends to and beyond those edges. In a system initially configured to incorporate our invention, the hard window 22 could instead be defined by, for example, the array 23 itself.

Such physical means for defining the "hard" window 22 also include energizing (or using signals from) even those CCDs only during a limited part of the motion 20. More specifically that is the part of the motion 20 during which they are within the window 22—that is, disposed between the upper and lower boundaries of the window 22—with respect to a particular registration mark of current interest (e.g., as illustrated, the next-to-the last illustrated mark 16).

By recording the signals from the CCDs while thus moving or scanning the CCD array over the mark at a consistent velocity, the system creates a two-dimensional matrix of data from the CCDs 21 within the window 22—in effect a picture of the mark region. (As a practical matter the scanning velocity is not necessarily constant, and in fact for servo-control purposes may advantageously be dithered.)

Then the system compares the resulting scan-produced date matrix with a virtual reference-mark template 24. (This terminology will be explained in some detail below.) The virtual template 24 occupies a predicted position, within a so-called "soft window" 23 that is used for purposes of calculation.

More specifically, the template 24 is initially placed at the best predicted position of the registration mark of interest. For this purpose the mark position is predicted not just in a general way but more specifically from the actual position found for the last preceding mark that was processed; hence the prediction can be made quite accurately.

Then the soft window 23 is defined as surrounding the template 24. From the predicted mark position and thus the predicted borders of the mark, the soft window is enlarged by twice the maximum worst-case errors that are believed can be accumulated over the distance between the previously processed mark and the present mark.

In defining the soft window 23, these predicted errors are distributed symmetrically all about the predicted borders of the mark. The soft window 23 thus surrounds the predicted mark symmetrically, and the starting position of the virtual template 24 is centered within the soft window 23.

The soft window 23 has very great importance in operation of our invention. Although data are physically collected over the entire region defined by the hard window 22, preferably the only data routinely used are those found within the soft window 23.

In short, the system generally looks for the mark only inside the soft window. This practice very greatly reduces the total amount of numerical processing normally required.

During the course of an entire plot, the soft window typically moves about within the hard window. Between any two adjacent marks, the change in soft-window position is ordinarily very small.

Nevertheless, in the subsequent processing straightforward tests may reveal that the mark being sought is, anomalously, not entirely within the soft window 23. In such a case, extension of the search to other areas of the hard window 22 is still available as a fallback technique.

In purest principle the system could store data from the soft window only—but this might be regarded as somewhat less safe. Physically rescanning an area with a different window setting would be exceedingly awkward, if not entirely impractical.

FIG. 1A symbolizes this comparison effort in a conceptual way. In effect the system seeks to locate the centroid 18d of the actual mark 18, rather than only an ill-defined edge—and attempts to determine values for the error or offset $\Delta x$, $\Delta y$ of the actual centroid 18d from the centroid 24d of the reference mark 24.

This is facilitated by choosing the reference mark to have the same shape, size, and areal disposition as the marks which the system was directed to preprint. Under these circumstances the influence of the edge and internal artifacts is strongly diluted within the areal mass of each mark.

This can be appreciated intuitively merely by looking at the marks 12-17 in FIG. 1 or the mark 18 in FIG. 1A. Even though they are extremely irregular, their predominant conformity to the reference marks 24 in a substantial sense is evident.

In other words, most of the areas and general shapes of the marks 12-17 are just as they should be; and quantitatively their sizes depart from what they should be by only a minor fraction. Considered in terms of area, size and overall shape, a much greater part of each mark 12-17 is consistent with the reference mark 24 than not.

Our invention, which preferably uses as much information about the area, shape, size and intended location of each mark as possible, may thus be regarded as providing a "smart" algorithm—as distinguished from one which searches blindly for almost any mark at all in a large region.

The determination is further facilitated by closely localizing the search, as just described, to a region in which the system was directed to preprint the mark. The robustness or error-insensitivity which our invention provides can accordingly now be seen from these graphical representations.

Figure 1B:
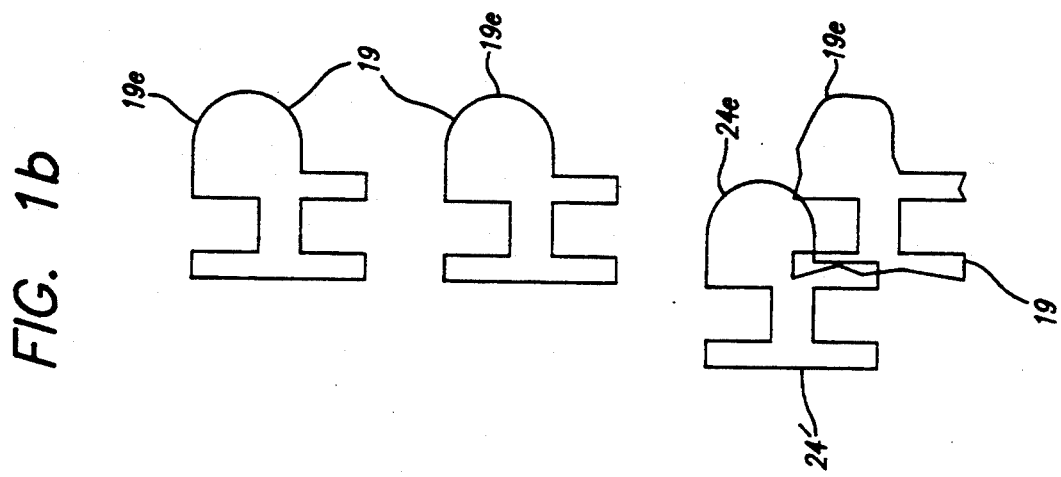
FIG. 1B is a like but somewhat fanciful showing of a series of marks—each formed as a very distinctive two-dimensional pattern made by consolidating two alphabetic characters—together with a matching template.

We believe that an even greater tolerance to error can be achieved by preptinting a series of marks 19 with some distinctive pattern, such as FIG. 1B shows in a fanciful example. This series of special-pattern marks 19 replaces the series of square marks 12-17 or 18 (FIGS. 1 and 1A) discussed above.

As will be apparent from FIG. 1B (particularly in conjunction with the operating procedure that will be detailed shortly), a search for the location of each distinctive mark pattern 19 by use of a matching reference mark 24' is extremely specific to the location of each sought mark 19, and responds to almost nothing else.

In particular not only the shape but also the areal disposition of the pattern in FIG. 1B is distinctive. That is, the area can be distributed nonuniformly and asymmetrically. In this example the area is concentrated or, figuratively speaking, "weighted" in one part 19e of each mark—and in the corresponding part 24e of the reference mark 24.

As a result the localization process too tends to be weighted not far from that part 19e; such a concentration of areal "weight" may help the system to most quickly find the general location of the mark centroid. After that, the distinctive shape of the mark will guide the system very sensitively to its closest possible match.

The mark pattern used as an example in FIG. 1B presents, by virtue of its areal disposition, an appearance of a solid, continuous figure—i.e., what might be called a "hard" shape. Use of such patterns is by no means necessary.

In fact this aspect of the invention particularly encompasses use of a pointillistic pattern or one that appears discontinuous, perhaps giving the perception of separate individual groupings or clusters of dots. In particular it is not at all necessary that the mark pattern appear to have any edge such as the systems of the prior art require.

Thus for instance a mark pattern resembling in areal disposition a picture of a nebula would be within the scope of the invention and suitable for use. Any such discontinuous or wispy pattern, whether or not possessing a clearly demarcated edge—but preferably with some areal concentration of pixels to facilitate initial lock-on of the search process—serves the utilitarian objectives of the invention while potentially promoting aesthetic values in the finished product.

In our invention one or more programmed auxiliary microprocessors calculate the position error between the reference and actual marks. Marks along both opposed sides or edges of the printing medium are employed, eliminating any need to detect edges of the medium.

Our preferred process is illustrated in FIG. 1C. Instead of real-time decision (and discarding) as the reading system passes each raster line in a mark, the multiline data matrix or picture of each registration-mark region is stored in the system memory. This storage is for the current registration mark only, not for a series of such marks.

In this sensing-and-storage process, if desired for somewhat greater accuracy, the response of each CCD element can be digitized to take into account intermediate gray levels on some sort of generally proportional basis. In general, however, a single black-or-white representation for each point in the physical scan will be sufficient.

In either case, it may be helpful to automatically normalize the darkness level which the system treats as middle gray. This can be done by, for example, instructing the system to automatically monitor the signal in regions of the printing medium that should be remote from any image or registration mark, or that is between marks, and treating this signal level as representing white.

An assumed darkness level relative to this may then be treated as middle gray. If preferred the system may also be directed to monitor the signal in regions that should be black (or, e.g., to use the darkest response anywhere in the field of view as black), and then to treat a signal level halfway between the two as middle gray.

Next the stored data are processed to find a best determination of the position of the actual mark. The process used here is, or corresponds very closely to, a mathematical procedure called "convolution"; a mathematician would recognize that the system in effect "convolves" the stored mark (or the entire data picture of its region) with a fictitious or virtual reference mark—in both the x and y directions. The reference mark can be said to work as a "convolving window".

Comprehension and use of our invention, however, do not require facility or familiarity with these mathematical concepts or processes. Rather, we intend that the procedure be fully understandable and implementable based upon the presentation in this document, which is at a practical level intended for persons such as senior technicians and programmers—the people skilled in this field.

Specifically, after the entire region of the mark has been scanned physically, the system begins an entirely separate iterative (repetitive) scanning process—in each pass slightly shifting the position of a template which closely resembles the intended size, shape and areal disposition of the preprinted mark. Here, however, neither the template nor the scanning is physical, but rather both exist only in the form of software procedures.

This is all that was meant by the term "virtual" used earlier. The template is merely a virtual template, and it is scanned over the data merely on a virtual basis.

This means simply that the mathematical processes—mostly simple addition—proceed as if the system were physically scanning over the mark region again and again, and as if in each physical scan the system were adding up the detector responses, in real time, to optical information that appeared to be possibly part of a registration mark. In actuality the system only passes again and again over the prestored data already accumulated through the "soft window" 23 (FIG. 1), defined as discussed earlier.

As FIG. 1 shows clearly, the soft window 23 extends over many pixels (originating physically as CCD detector elements) in the y direction—in other words, transverse to the direction 20 of medium motion. In addition, as FIG. 1 suggests by the illustrated height of the CCD elements in comparison with the soft window 23, the soft window also extends over at least several pixels in the x direction (originating physically as successive positions of the CCD elements during their physical motion 20 over the mark region).

FIG. 1C shows the geometrical relationships in greater detail. Preliminary to beginning each virtual scan, or pass of the FIG. 1 virtual template 24 over the stored data in the soft window 23, the virtual template is virtually placed in a specific position 24' (FIG. 1C) on the data image. In FIG. 1C the starting position 24 of the virtual template 24 is indicated using a relatively short dashed line.

In the first virtual scan of the iterative series, this position 24' is simply estimated from a mark-location prediction, based upon the found positions of earlier marks and the known intended spacing between registration marks. In subsequent virtual scans, the template position is established in other ways that will be described shortly.

Then, while holding the template 24 in the selected position 24', the system simply adds together all the positive responses—that is, the responses from all the pixels that represent (1) a part of the mark 18 region that was not white—which are (2) anywhere inside the template 24 at its position 24'. (In FIG. 1C the area occupied by the mark 18 is drawn crosshatched, and as will be seen from the drawing it is typically very irregular as mentioned in conjunction with FIGS. 1, 1A.)

In other words, the system determines the magnitude of the areal intersection 24'/18 of the window 24 with the mark 18.

If the CCD responses previously were digitized to recognize a gray scale—even a scale with only three or four values—the digitized values now are added so that this "magnitude" is weighted in some relation to optical darkness. If not, then the number of pixels that are dark enough to be identified as black is simply counted.

Although we do not regard the skilled person in this field as a mathematician, we digress briefly here for some comments that may be helpful for readers with mathematical training.

A mathematician might perceive the optical-density-weighted approach as being closer to a true convolution, in the sense that it represents multiplication of the quantity of pixels in the overlap area by the gray-scale magnitude, on a pixel-for-pixel basis. The unweighted or simple-counting approach, however, is actually equally as valid a convolution—with only the simplification that the magnitudes are all taken as one (unity), or in other words the system is single-place binary, with black represented by "1" and white by "0".

A density-weighted procedure, even if implemented only by the relatively simplified process of adding the magnitudes—rather than by a multiplication process as such—nevertheless is more time-consuming than the unweighted method. This is so because of the greater number of data bits to be processed in adding each value.

In either event (weighted or not), the system then makes a record of the total sum, and it associates that sum with the x, y position of the template 24.

Each such virtual scan within the soft window 23 starts from the window opening point 23o, which should be earlier than (above, in FIG. 1) the actual leading edge of the mark that appears in the data picture of the region. (Concurrently, as a digression, the window opening point advantageously is estimated for the next coming registration mark, taking into account the Δx, Δy shift of the mark as found so far, relative to the original estimated position.)

Actually it is not necessary, in general, to continue the virtual scan to the bottom of the soft window 23. The scan can stop when the system finds that the last one or two lines of pixels have not contributed positively to the summed response, as the occurrence of this observation means that a maximum has already been obtained and the bottom of the mark has been reached.

In addition to the starting x, y information as mentioned above, the number of steps to reach the maximum is also memorized for further comparison. If, however, the number of steps from the starting position to the maximum is less than the number corresponding to the expected height of the mark, this fact suggests that the template starting position was too low; the system then may be instructed to determine whether a higher starting point produces a larger sum.

Conversely if, as shown in FIG. 1C, the first significant. response arrives well after the opening position 23o, and the number n of steps from that first significant response to the maximum is less than the number corresponding to the expected height of the mark—and/or if the system simply finds response to be still increasing when the bottom of the virtual window is reached—the inference may be made that the template starting position was too high.

Rather than start the scan again with a lower template/window position, however, the system should save time by continuing to scan the stored data toward the bottom of the soft window 23 in effect shifting or extending downward the trial position of the template 24—and proceeding in this way until no increase in the sum results. As will be seen, the system will have several opportunities to use such a priori knowledge about the geometrical relationships involved, in view of the intended characteristics of the mark 18.

Intelligent use of these opportunities is very desirable as it can very greatly reduce the total time required for processing of each registration mark. In order to obtain the benefits of the present invention, however, it is not necessary to make use of all the tactics or criteria discussed here—or probably even crucial to use substantially the same ones; what is important is to use some reasonable amount of such advance information to inform and so facilitate the location process.

It is also possible that the system will accumulate, for the current virtual position of the template, a sum that is zero or very small. Such a result indicates that the mark is outside—typically to left or right from—the current virtual position of the template 24.

In this case the template 24 is virtually stepped to left or right for additional vertical summing—and the soft window 23 width thereby explored until the gross position of the mark is localized. (In this process, relatively large lateral steps can be employed.) Then the process continues as if the mark had been in the soft window at the outset.

The portions of the procedure outlined so far will quickly lead to finding a vertical (that is, longitudinal or x-direction) position, for the template 24, at which the sum of optical responses is maximum. Once a maximized vertical position has been found, however, the system must check to see whether a larger sum can be obtained at a different horizontal (that is, lateral, transverse, or -direction) position.

Accordingly the system shifts the template 24 to left or right and again finds the best vertical position for maximum response. The amount of desired lateral shift, in this case, can be made dependent upon the size of the sum already found.

If the sum is nearly as big as expected, a relatively small shift may be employed. If, however, the sum is a relatively small fraction of the expected sum, then a relatively large shift may be employed instead.

Another technique is to compare the responses from narrow groups of pixel columns along the left and right edges of the template 24 in its trial position 24'. The system may then move in the direction which thereby seems to promise higher response.

Still another technique is to compare the number of positive pixels in the x and y directions. The intended shape of the marks 12-18 establishes what the ratio of x and y counts should be—and, if they are not in generally this relationship, the next step may be selected accordingly.

For example, for a mark that is intended to be square, a verifying longitudinal scan may be skipped. The system may proceed instead directly to a lateral shift, if the number of x-direction counts is already significantly higher than the number of y-direction counts.

As noted earlier, by taking advantage of known information about the mark shape, size, areal disposition, spacing etc. by such "smart algorithm" techniques, the number of necessary independent passes over the data can be greatly reduced. Such techniques are important to successful use of the invention n commercial practice—where overall drawing speed is critical to competitive performance—because even with fast processors and fast arithmetic techniques the total time is limited.

These practical-minded shortcuts are relatively straight-forward to implement, as they merely reflect intuitively simple ways to avoid excess motion and therefore excess time. The basic (convolution) algorithm, as can now be better appreciated, is extremely simple and easy to use, for it consists of no more than simple addition or counting between straightforwardly established geometrical limits.

If after shifting in one horizontal direction the system finds that the resulting sum at the best vertical position is smaller than before, the system may return the template to its previous horizontal position and then shift in the opposite horizontal direction. Conversely if shifting in one horizontal direction results in a sum that is larger than before, but still not as large as expected, the system may shift further in the same direction—here too preferably selecting a size of shift that is appropriate to the magnitude of the sum found so far.

Once again it may be emphasized here that our invention can be used in a way that sidesteps multiplication as such, although mathematicians usually associate multiplication with the process of performing a convolution. In our invention, instead, we simply add values to perform a convolution—and then shift the data-set definition as appropriate and add again to perform another.

At each point in this procedure when a maximized value has been found, the system compares that current maximum with the previous one to determine whether the current search is in the right direction or not, and whether it is likely to have overshot the overall best position. The direction of further search is then chosen accordingly.

As mentioned earlier the system must take into account the possibility of flat-topped response due to the mismatch in size between the actual marks 12-18 and the template 24, or due to other causes. The algorithm therefore should enable the system to recognize when it is operating within such a plateau, and instruct it to move the template to left and right to establish the width of the plateau, and then determine the mark centroidal position as the lateral midpoint of the plateau.

Finally when the greatest possible sum is found, the ending position 24" of the template will closely correspond to the actual areal position 18 of the mark. In FIG. 1C the ending position 24" is drawn with relatively longer dashed lines.

(As previously mentioned, in actual operation the mark position is predicted quite accurately. In FIG. 1C, for tutorial purposes, the difference between the predicted and found positions 24', 24" has been exaggerated )

In addition to the many operating specifics which have now been presented concerning the processing of a data matrix collected within the hard-window 22 frame of FIG. 1C, it is also helpful to step back and at a more conceptual level compare this operation with the St. John system and some other systems discussed earlier.

As explained in that earlier discussion, the St. John et al. apparatus uses sensor pairs to find transition points between corresponding edge pairs, and in doing so relies upon pseudoareal properties of the sensors. It was also pointed out hat in that system the sensors could not be made large enough (in the x direction) to take in an entire mark at once, or the system would be inoperative.

It was also noted that they should not be made even slightly larger, since doing so would decrease the system's sensitivity to edge details. At the same time the sensors could not be made significantly smaller either—to increase sensitivity to edge details—because response of the system would fail to be monotonic and regular, and once again operation would become impossible.

In the present system, by comparison, the individual sensors can be made as small as desired to fully develop small details of each mark. The hard window 22 (e.g., the sensorarray length and the scan travel) can be made as large as desired to fully encompass each entire mark—and indeed the entire region where each mark is likely to appear—to permit full analysis of the situation applicable to substantially every mark.

As noted earlier some prior systems do use detector arrays but process each raster line in real time, discarding each line promptly—and thus discarding many opportunities to employ intelligence available in the correlation of details from successive lines. As will now be apparent the present system instead takes ample advantage of these opportunities.

The corresponding position of the final-template-position centroid (18d, FIG. 1A) is compared with that for the original prediction, to determine necessary shifts or offsets $\Delta x$, $\Delta y$ (FIG. 1A) to be applied for printing of the corresponding portions of the new image 36 (FIG. 1) in two dimensions. These calculated x and y errors $\Delta x$, $\Delta y$ are used to adjust the motor speed and the starting position of the recording head, respectively, as in the HP/MGCS system discussed earlier.

We shall discuss our invention in terms of its implementation as a modification of that system, because such implementation provides the embodiments of the invention which we consider most highly preferable. This description, however, will serve also to enable practice of our invention straight-forwardly in other hardware environments, using simply as an example the implementation here described for the HP/MGCS apparatus.

As will be recalled, the performance of the correction stage in that system is superior. The present invention accordingly enables utilization of greatly improved location information by that correction stage and by the main recording controller or microprocessor of the HP/MGCS system, and with greatly improved results—but within the correction stage that location information, once generated in accordance with the present invention, is utilized in essentially the same way as before.

Preferably, therefore, the system provides such information in a format compatible with the existing specifications of the main writing-head controller, and with minimal change to the very satisfactory correction stage, so that the advantages of the invention can be obtained with minimal impact on existing hardware and firmware.

In this way our invention obviates the problems of the prior art in a way which is also extremely economic. Not only new apparatus but also field retrofit can be accomplished thereby at relatively modest cost.

As shown in FIG. 2, one preferred embodiment or option—which entails minimum change to an existing system such as the HP/MGCS unit—requires replacing an existing circuit board 43 known historically as an "ACC board" or signal-processing board. The replacement ACC board 143 would provide a measuring circuit capable of receiving the same CCD or "video" input signals 42L, 42R, and providing the same output signals 144, 145 as the original ACC board 43.

To put this last point in more precise terms semantically, the new board 143 would provide electronic signals 144, 145 on the same output cables and in the same format, but of course they would not be the "same" signals as to their information content, magnitude or frequency, etc. Rather the signals 144, 145 would be different and in fact greatly improved, in reflecting the more accurate locating processes of the present invention.

In the apparatus embodiment which is preferred, signals pass next to a circuit board known as the "PLC board"—the abbreviation representing "Programmable Logic Circuit". It is the main system-control board, which in particular has control of most mechanical functions.

Preferably, to provide compatible outputs to the PLC board, the x and y errors would be converted to emulate, in signals 144, 145, the positions of the printing-medium left and right edges as the earlier ACC board reported them by signals 45 to the PLC board 46, as well as so-called "mark detect" signals 44 used by the PLC board.

FIG. 2 also shows a second option for implementation of the present invention. It is more direct and potentially more accurate, but entails revision of the operating instructions (the so-called "firmware") in the main read-only memory (ROM) of the system, as well as changes to provide a new ACC board 243.

The firmware changes in the ROM would allow the x and y position errors to pass in digital form 244/245 directly to the effectively new PLC board 246—that is to say, the PLC board with its new-ROM-dictated functions, although the board itself would be unchanged. In addition the averaging and control algorithms could be optimized to better match the dynamics of the new measurement system 243.

We now believe that the best mode of practicing our invention is this second option, because the added accuracy and flexibility more than offset the cost of a relatively minor firmware change. A block diagram of the new measuring circuit in accordance with this option appears as FIG. 3.

The analog electronics include low-pass filtering to eliminate noise, and prefiltering is assumed to be provided. Both such filtering steps, however, are at a time scale compatible with the determination of area for a single mark; they include nothing like the averaging processes of the prior art, which as will be recalled extend over a time scale corresponding to several or many marks.

Figure 3:
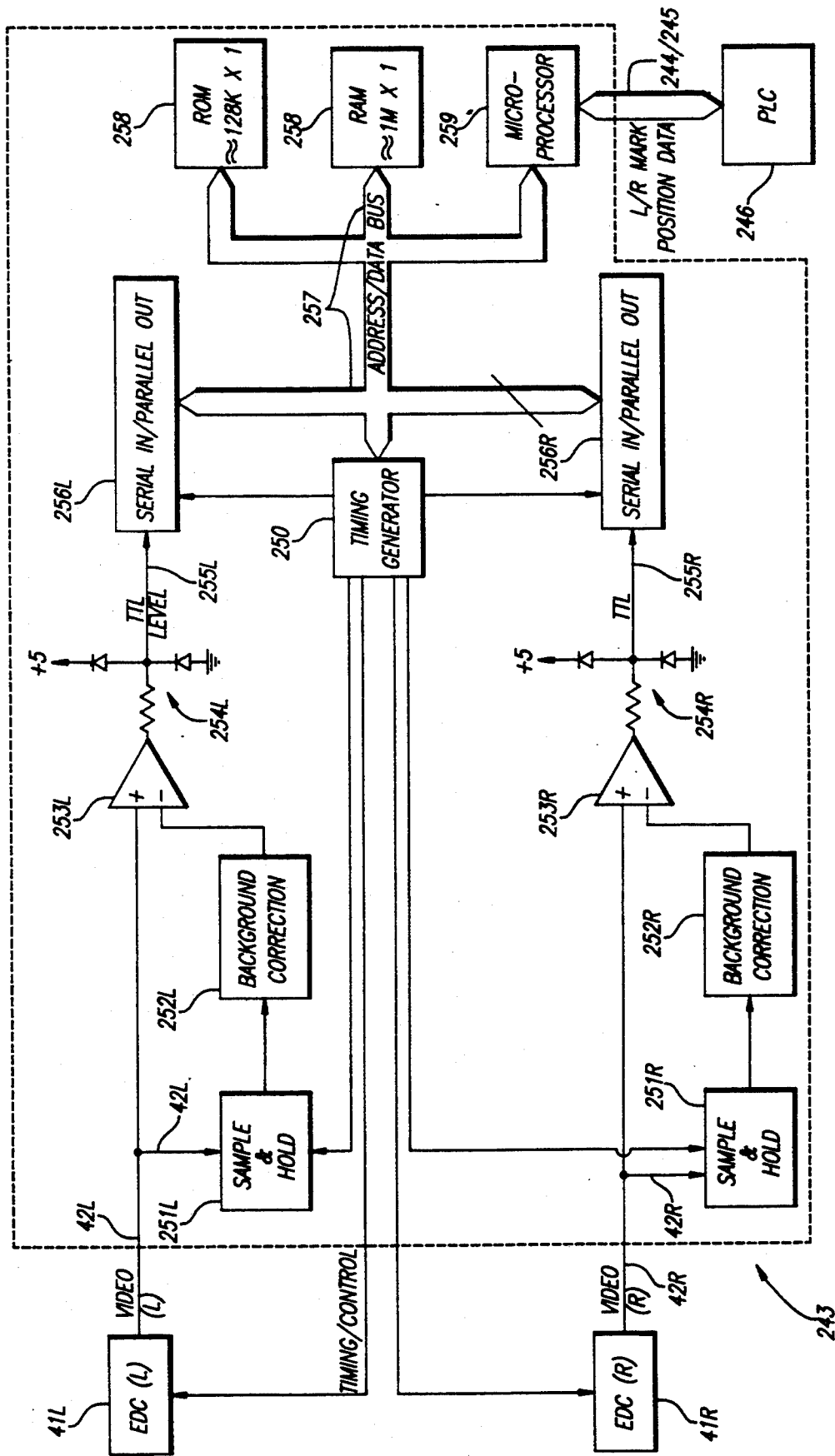
FIG. 3 is a more detailed block diagram, setting forth the embodiment which is now preferred (namely, the second alternative of FIG. 2)

In each of the left- and right-side channels, designated in FIG. 3 by suffixes "L" and "R" respectively, respective so-called "EDC" boards 41 provide CCD signals 42, which each contain both mark-detection portions and background portions. (Each EDC board manages the excitation power to, and the signals from, one of the two banks of charge-coupled detectors, CCDs, which are the registration-mark sensors used in the system). In each channel a sample-and-hold module 42 stores both, and a background-correction module 252 analyzes them to identify the background portions.

The background-correction module 42 then develops a longterm average of the background portions that is representative of the gray-scale level of the printing medium. The incoming CCD signal 42 and the average background level proceed to the positive and negative terminals, respectively, of a differential amplifier 253.

The output of this amplifier 253 accordingly represents the CCD signals relative to the background. With diode bias control at 254 these signals become suitable for treatment as digital values, i.e., high and low so-called "TTL level" signals 255; hence it can be seen that in the illustrated system a simple black/white discrimination is deemed adequate without the optional multiple-gray-scale placement suggested earlier.

The TTL signals 255 are grouped in serial-to-parallel converters 256 to develop multipixel data bytes for faster processing, and these are placed on a data bus 257 for storage in the RAM portions of system memory 258 and analysis in the ACC-board microprocessor 259.

Figure 4:
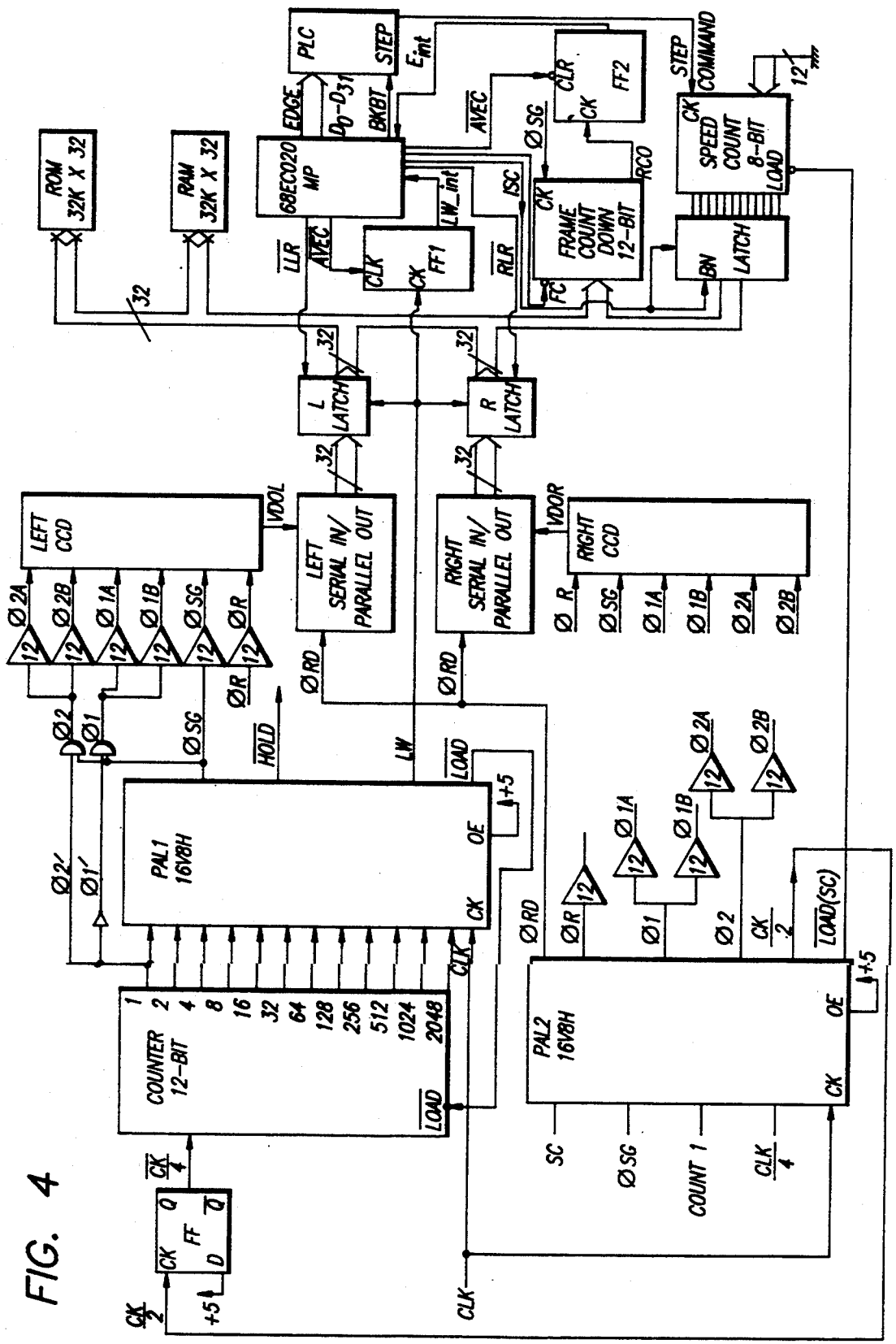
FIG. 4 is an electronic schematic, still more detailed, for the FIG. 3 system.

Operation of the several parts of this system—including the EDC boards that pass the signal inputs from the CCD arrays to the new ACC board 243—is coordinated by a timing-signal generator 250 on the ACC board as shown. FIG. 4 shows that the timing signals can be generated from the system clock train CLK by the two parallel "1" and "2" platforms of a PAL chip, operating in conjunction with a 12-bit divide-down counter. Of course many other ways of providing necessary sequencing are possible.

The serial-to-parallel converter outputs are advantageously buffered by latches, as shown, to allow the bus to dispose of other traffic before picking the next data sets from the converters. Twelve- and eight-bit counters on the bus are used to develop frame and speed pulses respectively.

Based upon the foregoing orientation, other details will be evident from FIG. 4, to those skilled in the field. Manufacturing unit cost of the replacement ACC board is about the same as the cost of the earlier one; and unit cost of the ROM is not affected at all by its revisions.

Because detection of the physical edge of the printing medium is no longer needed, the CCD detector array 21 (FIG. 1) at each side of the medium need only be about half the earlier length. Such a change represents a potential for considerable cost saving; however, an accompanying change would be required in the EDC boards which, as mentioned earlier, energize the CCDs 21 and process the CCD outputs.

Turning now to further details of the search process described above verbally, FIGS. 5 and 6 present in graphical form the specific procedural framework which we prefer. Although many other strategies will lead to substantially identical results, for those who may wish to simply follow our approach this illustration may be helpful. These drawings are considered self explanatory to persons skilled in the art; therefore only some comments will be offered here.

Figure 5:
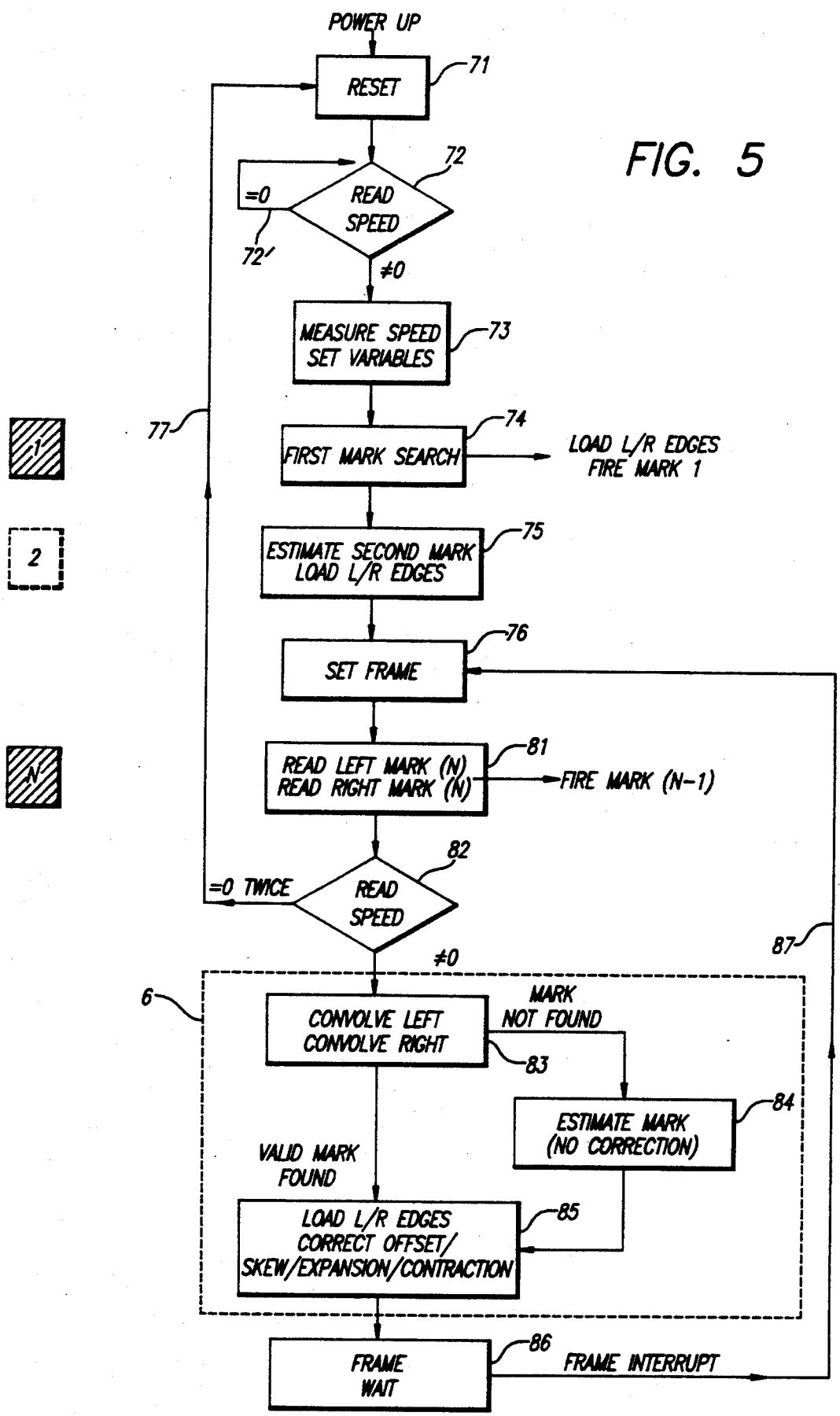
FIG. 5 is a software flow chart showing operation of a preferred embodiment of the invention in a four-pass mode.

Prominent in FIG. 5 are procedural steps 72, 72', 82, 77 related to "speed"—namely, reading and resetting the longitudinal speed of advance of the writing and reading mechanisms in relation to the printing medium. As suggested earlier, it is this physical scanning speed which establishes the relationship between the actual height (x dimension) of each registration mark and the pixel structure of the data stored in the physical pass of the CCD array over each mark—that is to say, the number of raster lines in each mark.

Accordingly it is essential that the speed be known correctly and corresponding variables set 73 accordingly. In particular if the read/write system is not moving at all the speed is reread 72'—or, if this condition is found after a number of marks have been processed, the registration system is reset 77.

The speed need not, however, be known precisely but only nominally—for example within a factor of perhaps 1.2 or roughly plus-or-minus 20%. If the system cannot read the speed directly from the speed-control subsystem (because, for example, the PLC board 246 has not been provided with a new ROM), then other means of obtaining a nominal speed reading may be substituted.

For instance in a first pass a preliminary known triangular mark (not illustrated) may be printed on the medium before the series of registration marks, at known speed; and in later passes the system may be directed to read that speed-index mark. The slope of the resulting signal can be used to determine the speed of the medium.

The first registration mark ("1" in FIG. 5) is not fully processed but only used 74 as a base position from which to obtain 75 an estimated starting point for the second mark ("2" in the drawing). The latter mark is actually the first to be accurately located by the system.

After that the system cycles repetitively through a major loop 76, 81–87, to process the general or "Nth" registration mark (denoted "N") in the drawing, generating speed-change signals as appropriate. At the end of each mark-locating run 76, 81–86 the system pauses (in the "Frame WAIT" block 86) until the right instant to begin looking for the next mark.

To begin that process, first an independent timer (running asynchronously with respect to the data-acquisition and computation process) generates a signal 87—termed the "frame interrupt" signal. This interrupt signal 87 in turn then initializes a new search matrix or "Frame" of data for the next mark in sequence.

The processes of performing the convolution described with some elaboration earlier in this document are contained primarily within the dashed block 6 in FIG. 5. Considerable additional detail on these steps appears in FIG. 6—which, however, is not strictly limited to the dashed block 6 of FIG. 5, but rather also includes some details 91 of the earlier FIG. 5 blocks 72, 82 that read speed, etc.

Figure 6A:
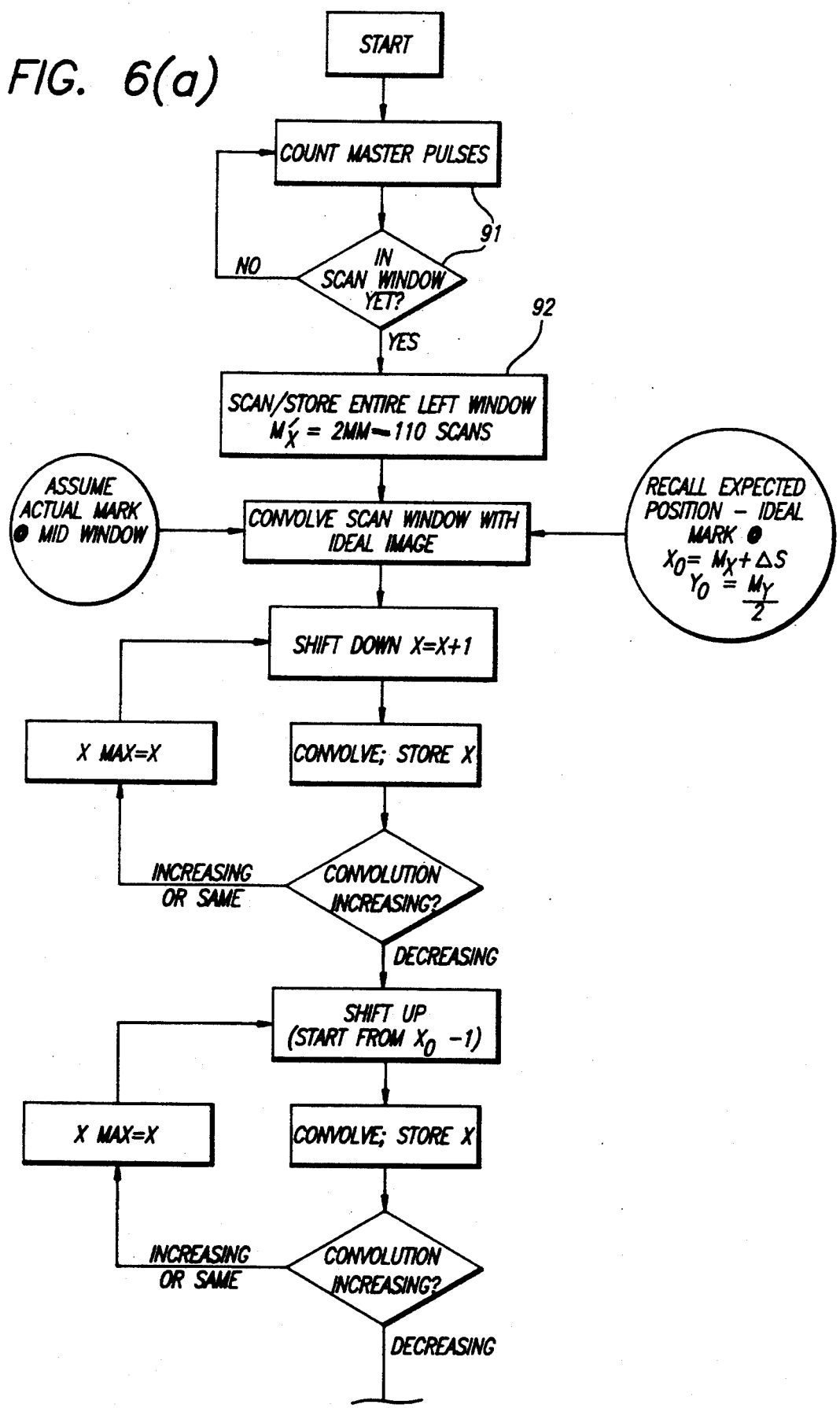
FIG. 6 is a similar but more detailed chart, showing details of operation—particularly with emphasis on steps enclosed in the dashed overblock 6 of FIG. 5.
Figure 6B:
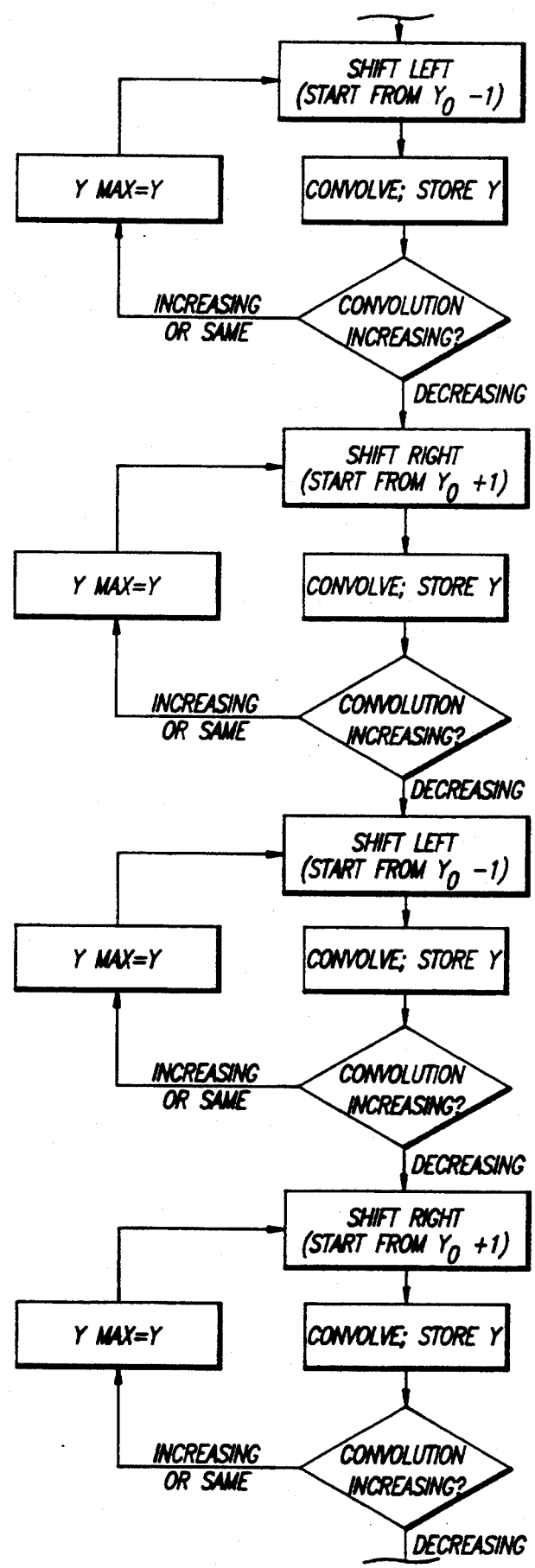
Figure 6C:
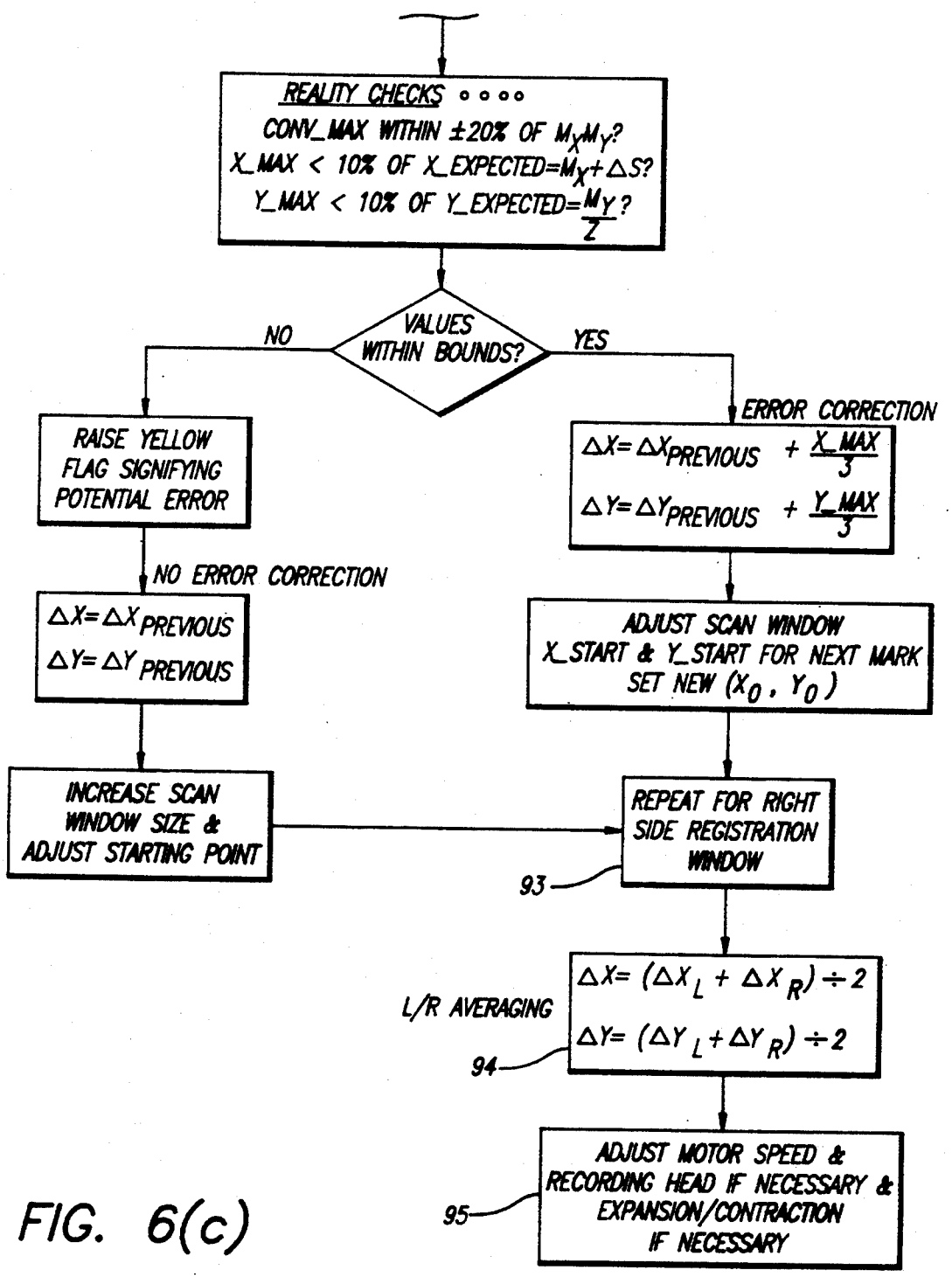

FIG. 6 includes a block that specifies storage of the data matrix for the "Entire Left Window". As will be understood, the following blocks—all the way down to, but not including, block 93 near the bottom of the drawing—relate exclusively to processing of that data stored 92 for the left-side window.

The whole storage and processing procedure then repeats 93 for the right-side window. (As mentioned earlier, all the features of FIG. 1 are duplicated for the right side of the medium 10.)

This repetition 93 for the right-side window enables development of a left-right averaging correction 94. (This left-right averaging is different from the previously discussed prior-art averaging of multiple marks along each edge of the medium.) The information from the two sides is then used in several different ways, which have already been mentioned.

One of these is to obviate the effects of medium expansion and contraction in the mainline direction. Such expansion or contraction is accommodated by selectively inserting interpolated bits, or by dropping bits, respectively, at the appropriate periodicity: for example, if the medium has expanded by one part in 500, then an interpolated bit is inserted every 500 bits along the mainline axis.

In addition, the same information has been found usable to develop an entirely adequate interpolation correction for any skew of the medium. Mechanical skew error in the HP/MGCS system normally is exceedingly small, amounting to at most only a very small number of pixels total—as between the opposite edges of the medium.

Therefore if the image is forced to the correct position at the midline of the medium, the maximum possible error along either edge is only half of that very small number of pixels; and as a routine matter is usually less than one pixel. Ordinarily this small residual can be disregarded.

In principle, however, interrelation of the data for the two sides of the printing medium can be advantageously used to develop a skew correction if desired. Such a correction can then be used to control operation of software or hardware, in an effort to actually remove effects of skew from the printed image.

It will be appreciated that an extremely complex—and relatively slow—software module would be required to implement such efforts. An alternative, namely use of a mechanical module such as St. John's $\theta$-correction subsystem, is if anything even more undesirable in terms of both initial cost and maintenance requirements. As can be seen, it is far more cost-effective to apply good mechanical design techniques to reduce the skew, in the first place, to a level such that the left-right averaging technique described just above suffices.

Finally the left-right averaged correction data are used to reduce or eliminate subline error by controlling the relative speed of the medium and the writing mechanism. In particular FIG. 6 also includes at extreme bottom the very important step of adjusting 95 the motor speed and the timing of signals forwarded to the recording head, if necessary—as indicated by the left-right average of the error values $\Delta y$. That is to say, these correction values developed by our invention are used to control the identification or firing time, or both, of writing pins in the electrostatic writing head.

As the image-recording or -writing system is meanwhile operating continuously, it is this adjustment step 95 that causes the overall system to in fact perform, for the subline axis, the "aligning and printing" of the "new image by reference to [the] located position of the preprinted mark on the medium"—as set forth in the preceding Summary of the Disclosure section of this document and in certain of the appended claims.

Figure 7:
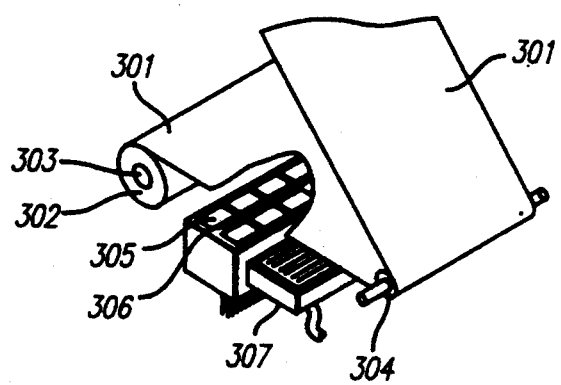
FIGS. 7 through 9 are after Jerome L. Johnson, *Principles of Nonimpact Printing* (Palatino Press 1986).
Figure 8:
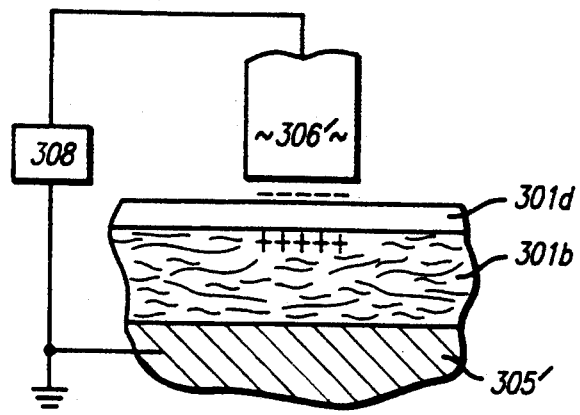
Figure 9:
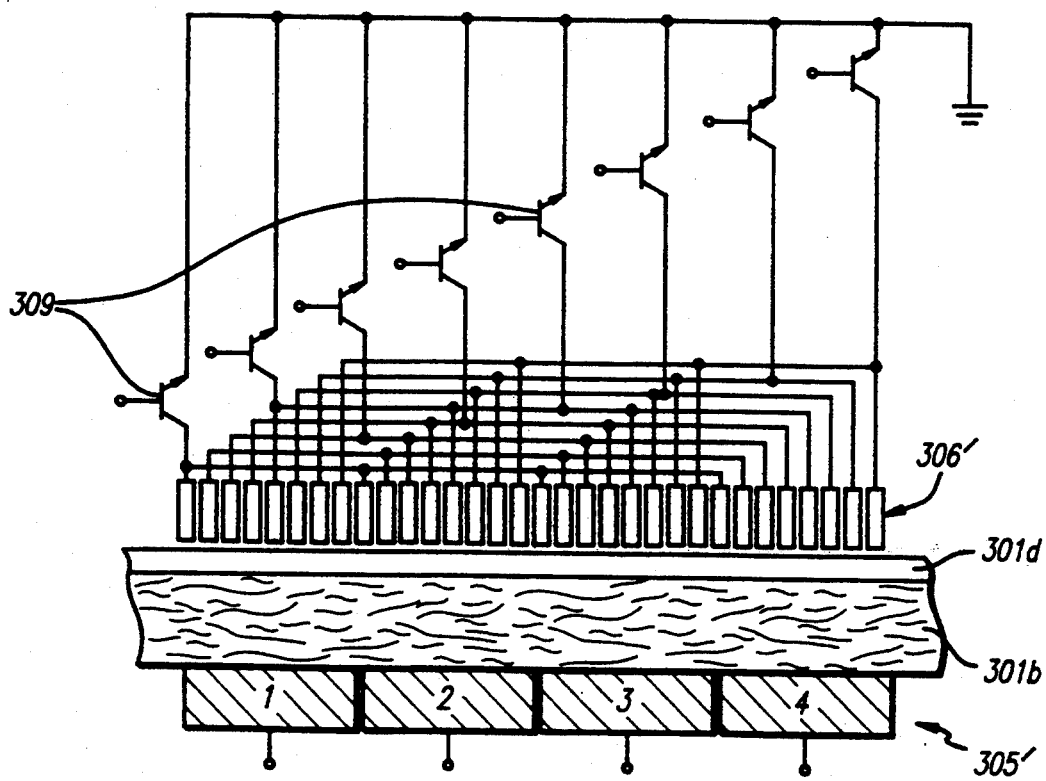

FIG. 7 through 9 illustrate the hardware which performs that actual recording or writing. It is substantially conventional and accordingly shown here only for reference purposes.

In FIG. 7 the recording paper or other medium 301 passes from a paper-supply roll 302, driven at its hub 303, to another drive roller 304. Between the two rollers 302, 304 the medium 301 traverses a control electrode 305, recording or "pin" electrode 306, and toner bath 307. In the specific system illustrated, the two electrodes 305, 306 are at the same side of the medium 301.

FIG. 8 shows more schematically a highly enlarged and somewhat conceptual view of similar apparatus—but here with the recording electrode 306 at the Opposite side of the medium 301 from the control or "back" electrode 305'. A print-potential circuit 308 between the two provides the voltage to deposit the needed charge. In addition the medium 301 is shown to include a relatively conductive base 301b and relatively insulative dielectric layer 301d.

In operation it is necessary that a charge pattern, representing a latent image, be received and maintained on the medium. This condition must persist for a period of time that necessarily intervenes between transfer of charge to the medium and conclusion of the process that develops the image.

Special media (such as so-called "electrographic papers") used in this process provide the base layer 301b at a thickness of roughly seventy microns, and the dielectric layer 301d at some 7.5 microns. These special structures are provided because the conductivity of paper used in general office applications and the like is both (1) inadequate for the preferred very rapid charge transfer, but (2) excessive for holding the charge for a long enough time.

In FIG. 9 appear a multiplicity of control electrodes or back electrodes 305' and an even greater multiplicity of recording electrodes 306'. In practical apparatus the electrodes are multiplex-actuated, typically by a multi-bit addressing system with drive buffers 309, for writing individual. pixels on basically a random-access basis.

The present invention is able to provide registration to accuracy better than plus-or-minus one print pixel (that is to say, one dot). It is believed to be robust in dealing with artifacts within and on the edges of registration marks, skew of the printing medium, optical-density variations due to variations of medium type and of environmental conditions as well as pigment (e.g., toner) delivery problems, scattering by the medium (particularly since its edges are no longer monitored), and optical deviations—whether due to CCD-array misalignment, dirt/paper dust, or ambient light.

In addition it permits use of considerably smaller and/or more-closely-spaced marks, or (as mentioned earlier) marks that are highly amenable to being given the character of a decorative border. Such cosmetic efforts here can be indulged freely without compromising accuracy. Our invention also has the effect of greatly relaxing the stringency of system-design limitations, such as print-head requirements, multiplexing schemes etc.

It will be understood that the foregoing disclosure is intended to be merely exemplary, and not to limit the scope of the invention—which is to be determined by reference to the appended claims.

We claim:

1. A method for locating a previously preprinted two-dimensional registration mark on a printing medium, and for then printing a new image in a specified positional relationship with said preprinted mark; said method comprising:

locating the position of the preprinted mark by using information about substantially the entire area of the preprinted mark; and then aligning and printing said new image by reference to said located position of the preprinted mark on the medium.

2. The method of claim 1:
also comprising, before said locating of the position, preprinting an image on a printing medium;
said preprinted image being printed in a known positional relationship with said preprinted two-dimensional registration mark; and
whereby said aligning and printing result in printing of the new image on a printing medium, in substantial alignment with the preprinted image.

3. The method of claim 2, wherein:
said aligning and printing comprise printing the new image onto the same medium as the preprinted image.

4. The method of claim 1, particularly for use when the preprinted mark has a known positional relationship with an already-preprinted image on the same medium as the preprinted mark, and wherein:
said aligning and printing comprise printing the new image onto the same medium as the preprinted image and preprinted mark.

5. The method of claim 1, wherein:
said locating comprises using information about the registration mark that includes at least one characteristic selected from the group consisting of:
the intended size of the mark,
the intended shape of the mark, and
the intended areal disposition of the mark.

6. The method of claim 5, wherein:
said locating further comprises using information about the registration mark that includes at least one characteristic selected from the group consisting of:
a predicted location of the mark, and
if plural marks are spaced along said printing medium, the intended spacing between marks.

7. The method of claim 1, wherein:
said locating comprises, in effect, finding the centroid of area of the preprinted mark.

8. A method for locating a preprinted two-dimensional registration mark on a printing medium, said mark having at least one distinctive two-dimensional characteristic; and for printing a new image in a specified positional relationship with the mark; said method comprising:
locating the position of the preprinted mark, with respect to each of two different directions relative to the medium, by using information about the at least one distinctive two-dimensional characteristic of the mark; and
then aligning and printing said new image by reference to said located position of the preprinted mark on the medium.

9. The method of claim 8, wherein said locating comprises the steps of:
defining a two-dimensional search template for which said at least one characteristic is substantially the same as for the preprinted two-dimensional registration mark;
then finding, relative to the preprinted mark on the medium, a position of the search template which is such as to substantially maximize the areal intersection of the mark with the search template; and
then identifying said search-template found position as the located position of the preprinted mark.

10. The method of claim 9, wherein:
the template extends over a multiplicity of pixels in each of at least two different directions relative to the printing medium.

11. The method of claim 9, wherein said finding step comprises the substeps of:
(a) selecting a relative starting position of the search template along both a first and a second direction, in relation to the printing medium, and initializing the search template at that starting position;
(b) then determining a relative position of the search template along the first direction, in relation to the preprinted mark on the printing medium, for which the areal intersection of the mark and search template is substantially maximized with respect to relative shifting along said first direction; and
(c) then determining a relative position of the search template along said second direction, in relation to the preprinted mark on the printing medium, for which the areal intersection of the mark and the search template is substantially maximized with respect to relative shifting along said second direction.

12. The method of claim 11, wherein said finding step comprises the further substep of:
iterating the two determining substeps (b) and (c) as a pair, in alternation, until substantially no increase in said maximized areal intersection results from further iteration.

13. The method of claim 12, wherein:
all said iterations are performed during substantially a single pass of relative physical displacement of mark-sensor means along the first direction, by:
storing automatic sensor responses to said preprinted mark for a multiplicity of positions along said full distance of relative displacement along said first direction, and for a multiplicity of positions along said second direction; and
analyzing and evaluating the stored responses by the method of claim 12.

14. The method of claim 13, wherein:
said analyzing is performed during continued relative displacement of the sensor means toward another preprinted mark in a series of preprinted marks, and is completed before the sensor means in said continued relative displacement reaches the other mark.

15. The method of claim 13, wherein:
said identifying step comprises establishing a distance and direction of deviation from a predicted location of the preprinted registration mark; and
said aligning and printing comprise offsetting at least a portion of the new image location by said distance and direction of deviation from the predicted location.

16. The method of claim 15, wherein:
said offsetting, in at least one of the first and second directions, is substantially an absolute offsetting of image-printing location, substantially without absolute movement of the printing medium.

17. The method of claim 16, wherein:
said absolute offsetting of image-printing location is accomplished, with respect to said at least one of the first and second directions, by means of a software-effectuated offsetting of the printing locations of a multiplicity of pixels in the image.

18. The method of claim 11, wherein said template-defining step comprises the substeps of:

defining the size of said template along one of said first and second directions as a range of relative travel between the substantially linear array and the printing medium; and defining the size of said template along the other of said first and second directions as the number of cells in a substantially linear array of detector cells.

19. The method of claim 11, wherein said template-defining step comprises the substeps of:

defining the size of said template along said first direction as a range of relative travel between the substantially linear array and the printing medium; and defining the size of said template along said second direction as a number of cells within a substantially linear array of detector cells.

20. The method of claim 19, wherein:

said selecting substep (a) comprises selecting a particular group of cells, equal in number to the number used in the second size-defining substep;

said first-mentioned determining substep (b) comprises the subsubstep of ascertaining a particular position for said range of relative travel of the array, along the first direction, for which detection of said preprinted registration mark by the particular group of cells, within said range of relative travel, is maximized; and said second-mentioned determining substep (c) comprises the subsubstep of ascertaining a new particular group of cells for which the detection of said preprinted registration mark, within said range of motion, is maximized; said new particular group of cells being equal in number to the number used in the second size-defining substep.

21. The method of claim 20, wherein:

said first-mentioned ascertaining subsubstep comprises providing relative travel between the substantially linear array and the printing medium, while accumulating response signals from the particular group of cells; and ascertaining said particular position by reference to a point in said provided relative physical motion at which said accumulated response signal ceases to increase.

22. The method of claim 21, wherein:

said second-mentioned ascertaining subsubstep comprises sequentially analyzing the detection of said preprinted registration mark for a succession of groups of cells, said succession being defined by progressive shifting of said number of cells along said linear array.

23. The method of claim 22, wherein:

said first- and second-mentioned ascertaining subsubsteps are performed during a single pass of said relative travel, by:

storing the responses for all the cells in the array over the full distance of said relative travel, and analyzing and evaluating the stored responses for a multiplicity of positions along said full distance of relative travel.

24. The method of claim 23, wherein:

said analyzing is performed during continued travel of the array of cells toward another preprinted mark in a pattern of preprinted marks, and is completed before said array of cells in said continued travel reaches the other mark.

25. The method of claim 20, wherein:

said second-mentioned ascertaining subsubstep comprises sequentially analyzing the detection of said preprinted registration mark for a succession of groups of cells, said succession being defined by progressive shifting of said number of cells along said linear array.

26. The method of claim 9, wherein:

said locating comprises, in effect, finding a search-template position for which the template centroid of area is substantially aligned with the preprinted-mark centroid of area.

27. The method of claim 9, wherein:

the search template is not exactly the same size, in at least one dimension, as the preprinted mark;

whereby the areal intersection is, in at least one dimension, a substantially flat-topped function of search-template position; and the finding step comprises selecting a search-template position that is substantially an average value of all positions within the flat top of said function.

28. The method of claim 8, wherein:

said locating comprises, in effect, finding the centroid of area of the preprinted mark.

29. The method of claim 8, wherein said locating comprises:

resolving each preprinted mark into a multiplicity of pixels in each of at least two different directions relative to the printing medium; and evaluating the preprinted mark as so resolved.

30. The method of claim 8, wherein said at least one characteristic is selected from the group consisting of:

the intended size of the mark in two dimensions;

the intended shape of the mark; and the intended areal disposition of the mark.

31. The method of claim 30, wherein:

said at least one characteristic further comprises said predicted location of the mark;

said identifying step comprises establishing a distance of deviation from the predicted location; and said aligning and printing comprise offsetting at least a portion of the new image by said distance of deviation from the predicted location.

32. A method for printing a new image substantially in a desired location on a printing medium; said method comprising:

providing on the printing medium a preprinted two-dimensional registration mark that has an associated known two-dimensional pattern, and that also has a known positional relationship with the desired new-image location on the medium;

then locating the position of the preprinted mark, with respect to each of two different directions relative to the medium, by using information about its said associated two-dimensional pattern; and then aligning and printing a new image by reference to said located position of the preprinted mark on the medium.

33. The method of claim 32:

also comprising, before said locating of the position, preprinting an image on a printing medium;

said preprinted image being printed in a known positional relationship with a two-dimensional registration mark; and whereby said aligning and printing result in printing the new image on a printing medium, in substantial alignment with the preprinted image.

34. The method of claim 33, wherein:

said aligning and printing comprise printing the new image on the same medium as said preprinted image.

35. The method of claim 32, particularly for use when the preprinted mark has a known positional relationship with an already-preprinted image on the medium, and wherein:

said aligning and printing comprise printing the new image on the same medium as said preprinted image.

36. The method of claim 32, wherein:

the known two-dimensional pattern that is associated with the mark has the property that its autoconvolution deteriorates relatively rapidly with positional error.

37. The method of claim 32, wherein:

said information about the two-dimensional pattern includes information that is related to the intended areal disposition of the pattern.

38. The method of claim 32, wherein:

said information about the two-dimensional pattern includes at least one characteristic selected from the group consisting of:

the intended size of the pattern, the intended shape of the pattern, and the intended areal disposition of the pattern.

39. The method of claim 38, wherein:

said locating further comprises using information about the registration mark that includes at least one characteristic selected from the group consisting of:

a predicted location of the mark, and if plural marks are spaced along said printing medium, the intended spacing between marks.

40. A method for locating a preprinted registration mark on a printing medium, and for printing a new image in a specified positional relationship with the mark; said method comprising:

locating the position of the preprinted mark by first scanning the region of the mark to obtain a two-dimensional representation of the region and then analyzing the two-dimensional representation; and then aligning and printing said new image by reference to said located position of the preprinted mark on the medium.

41. A method for locating a preprinted registration mark on a printing medium, and for printing a new image in a specified positional relationship with the mark; said method comprising:

locating the position of the preprinted mark by finding its areal centroid on the printing medium; and then aligning and printing said new image by reference to said centroid on the medium.

42. Apparatus for locating a preprinted registration mark on a printing medium and printing a new image in a specified positional relationship with the preprinted registration mark; said apparatus comprising:

means for disposing such medium for printing thereon;

means for printing a new image on such medium;

means for controlling the relative position of such medium and said printing means;

electrooptical sensors responsive to such preprinted registration mark;

means for effecting relative physical movement of the sensors and such medium to produce a matrix of said signals corresponding to a region of the medium;

electronic circuit means for analyzing said signal matrix to locate the position of the preprinted registration mark, with respect to each of two different directions, by reference to information selected from the group consisting of:

information about the entire area of the preprinted registration mark, information about a two-dimensional characteristic of the preprinted registration mark, information about a two-dimensional pattern associated with the preprinted registration mark, and the position of the areal centroid of the preprinted registration mark; and means for using said position of the preprinted registration mark to adjust the printing means and the relative-position-controlling means.

* * * * *